United States Patent
Taguchi et al.

(10) Patent No.: US 6,603,722 B1
(45) Date of Patent: Aug. 5, 2003

(54) SYSTEM FOR REPRODUCING DATA WITH INCREASED ACCURACY BY REDUCING DIFFERENCE BETWEEN SAMPLED AND EXPECTED VALUES

(75) Inventors: Masakazu Taguchi, Kawasaki (JP); Satoshi Furuta, Kato (JP); Toru Fujiwara, Kato (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/694,066

(22) Filed: Oct. 19, 2000

Related U.S. Application Data

(63) Continuation of application No. PCT/JP99/01273, filed on Mar. 16, 1999.

(30) Foreign Application Priority Data

May 18, 1998 (JP) .......................................... 10-135467
Feb. 18, 1999 (JP) .......................................... 11-040184

(51) Int. Cl.[7] ................................................. G11B 5/76
(52) U.S. Cl. ................. 369/59.21; 369/59.2; 369/47.35
(58) Field of Search .......................... 369/59.21, 59.22, 369/59.2, 47.14, 47.15, 47.17, 47.18, 47.28, 47.35, 53.12, 53.13, 53.31, 53.32, 53.33, 53.34, 124.05, 124.14

(56) References Cited

U.S. PATENT DOCUMENTS 5,796,693 A * 8/1998 Taguchi et al. ............ 369/59.22

FOREIGN PATENT DOCUMENTS

JP 8017148 1/1996
JP 9102172 4/1997

* cited by examiner

*Primary Examiner*—Paul W. Huber
(74) *Attorney, Agent, or Firm*—Greer, Burns & Crain, Ltd.

(57) ABSTRACT

A data reproduction system, which determines reproduced data based on comparison results of path metrics calculated in accordance with a Viterbi algorithm based on branch metrics calculated from expected values and a sampled value of a readout signal, includes an expected value setting unit for variably setting the expected values used for a calculation of the branch metrics in order to perform a Viterbi detection process without being easily affected by the transient response, offset variation, phase error and nonlinear torsion component of the readout signal. The readout signal is obtained from a recording medium on which data is recorded in accordance with a recording signal of a partial response waveform, the expected values are determined by the partial response waveform, and the sampled value is obtained by sampling the readout signal at a predetermined frequency.

22 Claims, 28 Drawing Sheets

FIG.5

| | t-3 c | t-2 b | t-1 a | t 1 | | EXPECTED VALUES |
|---|---|---|---|---|---|---|
| S0 | 0 | 0 | 0 | 0 | S0 | P0=0 |
| S1 | 1 | 0 | 0 | 0 | S0 | P1=c |
| S2 | 0 | 1 | 0 | 0 | S1 | P2=b |
| S3 | 1 | 1 | 0 | 0 | S1 | P3=b+c |
| S4 | 0 | 0 | 1 | 0 | S2 | P4=a |
| S5 | 1 | 0 | 1 | 0 | S2 | P5=a+c |
| S6 | 0 | 1 | 1 | 0 | S3 | P6=a+b |
| S7 | 1 | 1 | 1 | 0 | S3 | P7=a+b+c |

| | t-3 c | t-2 b | t-1 a | t 1 | | EXPECTED VALUES |
|---|---|---|---|---|---|---|
| S0 | 0 | 0 | 0 | 1 | S4 | P8=1 |
| S1 | 1 | 0 | 0 | 1 | S4 | P9=1+c |
| S2 | 0 | 1 | 0 | 1 | S5 | P10=1+b |
| S3 | 1 | 1 | 0 | 1 | S5 | P11=1+b+c |
| S4 | 0 | 0 | 1 | 1 | S6 | P12=1+a |
| S5 | 1 | 0 | 1 | 1 | S6 | P13=1+a+c |
| S6 | 0 | 1 | 1 | 1 | S7 | P14=1+a+b |
| S7 | 1 | 1 | 1 | 1 | S7 | P15=1+a+b+c |

SYSTEM FOR REPRODUCING DATA WITH INCREASED ACCURACY BY REDUCING DIFFERENCE BETWEEN SAMPLED AND EXPECTED VALUES

This is a continuation of application Ser. No. PCT/JP99/01273, filed Mar. 16, 1999.

TECHNICAL FIELD

The present invention relates to a data reproduction system for reproducing data from a recording medium used for data recording apparatus including an optical disk apparatus, a magneto-optical disk apparatus, and a magnetic disk apparatus.

BACKGROUND ART

For example, in a variety of fields such as recording/reproduction of image data and recording of codes for computers, attempts have been made to use an optical disk recording medium, such as an optical disk or a magneto-optical disk, for an optical disk apparatus because of its large capacity, compatibility and high reliability.

The optical disk apparatus is required to have a data recording/reproduction method with higher accuracy as a recording density increases. For example, proposed as such a data recording/reproduction method with higher accuracy for the optical disk recording medium is a combination of recording a recording data signal onto an optical disk recording medium by modulating the signal to a so-called partial response (PR) waveform and detecting maximum likelihood data by a so-called Viterbi detector (maximum likelihood data detector) after sampling a readout signal from the optical disk recording medium at a predetermined sampling frequency.

A basic structure of a generally known Viterbi detector is shown in FIG. 1.

According to FIG. 1, the Viterbi detector includes a branch metric calculation unit 10, an ACS (add-compare-select) unit 11, a path metric memory 12, and a path memory 13. For example, when the Viterbi detector is applied to the data reproduction system of a magneto-optical disk apparatus, the branch metric calculation unit 10 calculates branch metrics (BM) each corresponding to a difference between a sampled value yt and each of expected values of a readout signal from a magneto-optical disk. The expected values, which depend on a PR waveform employed in the recording of data, are values which the readout signal should take. When one sampled value yt is obtained, the branch metrics are calculated with respect to all the expected values.

The ACS unit 11 adds each of the above-mentioned branch metrics to a corresponding one of previous path metrics (PM), which are calculated at a previous sampling timing to be stored in the path metric memory 12. The ACS unit 11 then compares each given pair of the calculated path metrics so as to select the smaller of the two. The selected path metrics are stored in the path metric memory 12 as new path metrics. According to the above-described calculation, a path metric is expressed as a cumulative value of branch metrics. Selecting the smaller path metric as described above corresponds to selecting a state transition path. That is to say, the ACS unit 11 always selects a path so as to take the smallest path metric.

Data (binary data) corresponding to the paths selected in the above-described manner are supplied to the path memory 13 from the ACS unit 11. In the path memory 13, the data corresponding to the selected paths is shifted, while data corresponding to non-selected paths is discarded. As a result, data corresponding to a surviving path is output from the path memory 13 as detected data.

Thus, the data recorded with high density on a magneto-optical disk can be reproduced with high accuracy by recording the data in the PR waveform and detecting the maximum likelihood data by using the Viterbi detector.

If the waveform of a readout signal as shown in FIG. 2(a), for example, is obtained from a magneto-optical disk, the sampled values of the readout signal are shown in a histogram having a shape as shown in FIG. 2(b) or (c). This example shows a case of subjecting data recorded with a PR(1, 1) waveform to Viterbi detection (maximum likelihood sequence detection). In the case of considering only white noise, the distribution of the sampled values includes three peak levels corresponding to expected values as shown in FIG. 2(b).

However, if the readout signal includes a transient response, an offset variation, a phase error or a nonlinear torsion component, the sampled values are distributed irregularly as shown in FIG. 2(C). A sufficient error rate characteristic cannot be obtained by subjecting such sampled values to Viterbi detection by using the expected values fixed to constant values.

It is known that greater improvement in a data detection accuracy can be achieved with a longer constraint length of a PR waveform such as a PR(1, 2, 1) or a PR(1, 2, 2, 1). However, the longer constraint length decreases an amplitude margin per expected value, so that a data reproduction process is more easily affected by the transient response, the offset variation, the phase error or the like so as to deteriorate an error rate.

Further, in recent years, attempts have been made to put into practical use a recording medium having an MSR (Magnetically induced Super Resolution) effect in order to realize high-density recording of data. In this MSR medium, super resolution effect is produced by forming a mask using the heat distribution of a light beam. Therefore, a nonlinear torsion component is generated in a readout signal by a non-uniform heat distribution of the light beam moving on a recording medium, thus causing distortion of the waveform of the readout signal. As a result, ideal sampled values of the readout signal cannot be obtained, thus contributing to the deterioration of the error rate.

Moreover, uneven rotation of a spindle rotating an optical disk recording medium, and recording/reproduction of data by different disk drives cause phase and frequency deviations between a reference clock and recorded data. A phase-locked loop is employed to eliminate these deviations. However, a signal resolution is lowered in the case of the longer constraint length as described above, so that it becomes difficult to obtain a stable phase error signal for synchronization by binarizing the readout signal in the conventional way.

DISCLOSURE OF THE INVENTION

It is a general object of the present invention to provide an improved, useful data reproduction system in which the above disadvantages are eliminated.

A more specific object of the present invention is to provide a data reproduction system which allows a Viterbi detection process to be performed without being easily affected by the transient response, offset variation, phase error and nonlinear torsion component of a readout signal even though the constraint length of a PR waveform used for the recording of data onto a magneto-optical recording medium is increased.

A further object is to provide a data reproduction system in which data can be reproduced by using a more stable phase error signal for synchronization obtained from a readout signal even though the constraint length of a PR waveform used for the recording of data onto a magneto-optical recording medium is increased.

In order to achieve the above objects, a data reproduction system according to the present invention, which system determines reproduced data based on comparison results of path metrics calculated in accordance with a Viterbi algorithm based on branch metrics calculated from expected values and a sampled value of a readout signal, includes an expected value setting unit for variably setting the expected values used for a calculation of the branch metrics, the readout signal being obtained from a recording medium on which data is recorded in accordance with a recording signal of a partial response waveform, the expected values being determined by the partial response waveform, and the sampled value being obtained by sampling the readout signal at a predetermined frequency.

According to the above-described data reproduction system, since the expected values, which are values which should be obtained when sampled, can be set variably, differences between real sampled values and the expected values can be reduced by varying the expected values in accordance with the characteristic of the readout signal (an offset, a nonlinear torsion, etc.) which depends on the characteristics of the recording medium and the reproduction system. As a result, data having more likelihood can be reproduced with higher accuracy.

The recording of data with a PR waveform of a longer constraint length requires an increased number of expected values to be set. In such a case, in the light of specifying necessary expected values with ease, the above-described expected value setting unit of the above-described data reproduction system can be structured to include an expected value specification unit which specifies expected values used for obtaining a smallest path metric every time the readout signal is sampled so as to set the expected values specified in said expected value specification unit.

The expected values used for obtaining the smallest path metric when the readout signal is sampled are the values the sampled values should take. Therefore, the expected values corresponding to the sampled values can be set easily in the above-described data reproduction system.

The above-described expected value setting unit can be structured to include a default expected value setting unit which sets default values of the expected values so as to calculate expected values to be set by correcting the default values of the expected values set in said default expected value setting unit.

The default expected value setting unit can initially set the expected values determined by the partial response waveform of the recording signal as the default expected values. From a viewpoint that more proper expected values can be set in a data reproduction process, the above-described default expected value setting unit can be structured to include a unit which sets the calculated expected values as default values used for calculating next expected values to be set.

A readout signal from an optical disk recording medium is likely to drift immediately after the beginning of the reproduction of data (a transient response). In this case, real expected values (values which should be obtained when sampled) shift from expected values determined by the partial response waveform of a recording signal. Therefore, in order to reproduce accurate data even if the readout signal drifts immediately after the start of the reproduction of the data, the above-described system can be structured to include an initial offset setting unit which sets, as an initial offset, an offset included in the readout signal obtained immediately after the start of the reproduction of the data, and to provide the expected value setting unit with a first expected value calculation unit which calculates expected values to be set based on the initial offset set in the initial offset setting unit.

According to the above-described data reproduction system, the initial signal offset setting unit sets the offset included in the readout signal obtained immediately after the start of the reproduction of the data as the initial offset, and the first expected value calculation unit calculates the expected values to be set based on the initial offset. Therefore, even though the readout signal drifts immediately after the start of the reproduction of the data (that is, the readout signal includes the initial offset), it is possible to set the expected values considering the drift component.

During the steady reproduction of a signal, a readout signal drifts in some cases depending on the characteristic of an optical disk recording medium, the specification of a data reproduction system in use, and an environment such as temperature. In such a case, real expected values (values which should be obtained when sampled) shift from expected values determined by the partial response waveform of a recording signal. Therefore, in order to reproduce accurate data even if the readout signal drifts during the data reproduction process, the above-described system can be structured to include an offset detection unit which detects an offset included in the readout signal obtained steadily, and to provide the expected value setting unit with a second expected value calculation unit which calculates expected values to be set based on the offset detected in the offset detection unit.

According to the above-described data reproduction system, when the offset detection unit detects the offset included in the readout signal during the steady reproduction of the signal, the second expected value calculation unit calculates the expected values to be set based on the offset. Therefore, even though the readout signal drifts during the steady reproduction of the signal (that is, the readout signal includes the initial offset), it is possible to set the expected values considering the drift component.

In some cases, a readout signal is distorted by double refraction generated in an optical head so as to show a nonlinearity. In this case, real expected values (values which should be obtained when sampled) shift from expected values determined by the partial response waveform of a recording signal. Therefore, in order to reproduce accurate data even if the readout signal is distorted to show the nonlinearity, the above-described system can be structured to include a nonlinear component extraction unit which extracts a nonlinear torsion component included in the readout signal, and to provide the expected value setting unit with a third expected value calculation unit which calculates expected values to be set based on the nonlinear torsion component extracted in the nonlinear component extraction unit.

According to the above-described data reproduction system, when the nonlinear component extraction unit extracts the nonlinear component included in the readout signal during the reproduction of the signal, the third expected value calculation unit calculates the expected values to be set based on the nonlinear torsion component. Therefore, even though the readout signal is distorted to show a nonlinearity, it is possible to set the expected values considering the nonlinear torsion.

In order to obtain proper expected values in each phase of a signal reproduction based on the above-described initial offset, steady offset and nonlinear torsion, which can be included in a readout signal, each of the above-described systems can be structured to include: an initial offset setting unit which sets, as an initial offset, an offset included in the readout signal obtained immediately after a start of a reproduction of the data; an offset detection unit which detects an offset included in the readout signal obtained steadily; and a nonlinear component extraction unit which extracts a nonlinear torsion component included in the readout signal, and to provide the expected value setting unit with a default expected value setting unit which sets default values of the expected values, and with an expected value correction unit which corrects the default values of the expected values set in the default expected value setting unit, based on at least one of the initial offset set in the initial offset setting unit, the offset detected in the offset detection unit, or the nonlinear torsion component extracted in the nonlinear component extraction unit.

According to the above-described data reproduction system, the expected value setting unit sets new expected values by correcting the default values based on at least one of the obtained initial offset, steady offset and nonlinear torsion component. For example, it is desirable to correct the default values based on the initial offset at a point immediately after the reproduction of the signal, and on the steady offset and nonlinear torsion component during the steady signal reproduction process. Further, especially when the readout signal has a small nonlinear torsion or a small steady offset, the default values can be corrected based only on the steady offset or the nonlinear torsion component during the steady signal reproduction process.

In order to calculate new expected values with higher accuracy by varying the default values of the expected values in accordance with a variation such as an offset or a nonlinear torsion of the readout signal, the above-described system can be structured to include a unit which sets expected values obtained by the correction in the expected value correction unit as default values to be used in a next correction therein.

When the bit arrangement of data is determined in accordance with a predetermined rule (for example, a 1/7 run length limit, or a 2/7 run length rule) during the recording of the data, reproduced data cannot have a bit arrangement other than the one determined in accordance with such a rule. Therefore, in order to achieve a data reproduction with higher accuracy by restricting the data having a bit arrangement against such a bit arrangement rule for recording the data, the above-described system can be structured to include a data restriction unit which forcibly restricts, on the basis of a bit arrangement rule during recording of the data, the reproduced data obtained based on the comparison results of the path metrics.

In order to achieve the further object of the present invention, another data reproduction system according to the present invention, which system determines reproduced data based on comparison results of path metrics calculated in accordance with a Viterbi algorithm based on branch metrics calculated from expected values and a sampled value of a readout signal, includes: a phase error calculation unit which calculates a phase error based on differences between the sampled value and expected values used for a calculation of the branch metrics; and a synchronizing clock generation unit which generates a clock signal determining sampling timings of the readout signal based on the phase error obtained in said phase error calculation unit, the readout signal being obtained from a recording medium on which data is recorded in accordance with a recording signal of a partial response waveform, the expected values being determined by the partial response waveform, and the sampled value being obtained by sampling the readout signal at a predetermined frequency.

According to the above-described data reproduction system, since the expected values are signal values which should be obtained, a difference between the real sampled value and the corresponding expected value corresponds to a difference between a timing at which a sampling should be performed and a real sampling timing. Therefore, the phase error is calculated based on the difference between the sampled value and the corresponding expected value, and a clock signal determining the sampling timings of the readout signal is determined based on the phase error.

The synchronizing clock generation unit can include a PLL circuit which adjusts the phase and frequency of an oscillation clock so as to eliminate the phase error, or a delay circuit which delays an external clock so as to eliminate the phase error.

In order to achieve the above object, another data reproduction system according to the present invention, which system determines reproduced data based on comparison results of path metrics calculated in accordance with a Viterbi algorithm based on branch metrics calculated from expected values and a sampled value of a readout signal, includes: an expected value setting unit which sets the expected values used for a calculation of the branch metrics; a nonlinear portion detection unit which detects a nonlinear portion of the readout signal; a nonlinearity obtaining unit which obtains nonlinearities included in the readout signal when said nonlinear portion detection unit detects a given nonlinear portion of the readout signal; and an expected value adjustment unit which adjusts the expected values set in said expected value setting unit based on the nonlinearities calculated in said nonlinearity calculation unit, the readout signal being obtained from a recording medium on which data is recorded in accordance with a recording signal of a partial response waveform, the expected values being determined by the partial response waveform, and the sampled value being obtained by sampling the readout signal at a predetermined frequency.

According to the above-described data reproduction system, the expected values used for the calculation of the branch metrics are adjusted based on the nonlinearities of the nonlinear portion of the readout signal. As a result, even though the readout signal shows a nonlinearity, the expected values are adjusted based on the nonlinearities with respect to the nonlinear portion, thus increasing a margin for the sampled value for reproducing proper data from the nonlinear portion of the readout signal so as to allow the data reproduction with higher accuracy.

The above-described nonlinearity obtaining unit can be structured to hold in advance a nonlinearity determined by the characteristic of a recording medium and to obtain the held nonlinearity. The nonlinearity obtaining unit can also be structured to include a nonlinearity calculation unit which calculates the nonlinearities based on the sampled value of the readout signal.

In order to achieve the above object, another data reproduction system according to the present invention, which system determines reproduced data based on comparison results of path metrics calculated in accordance with a Viterbi algorithm based on branch metrics calculated from expected values and a sampled value of a readout signal, includes: an expected value setting unit which sets the expected values used for a calculation of the branch metrics; a nonlinear portion detection unit which detects a nonlinear portion of the readout signal; a first nonlinearity calculation unit which calculates, based on the sampled value of the readout signal, first nonlinearities of a given nonlinear portion of the readout signal when said nonlinear portion detection unit detects the given nonlinear portion; a second nonlinearity calculation unit which calculates, based on the sampled value of the readout signal, second nonlinearities at a sampling point next to the detected portion of the readout signal, the second nonlinearities being smaller than the first nonlinearities; and an expected value adjustment unit which adjusts, based on the first nonlinearities calculated in said first nonlinearity calculation unit, the expected values set in said expected value setting unit with respect to the sampled value sampled at the detected portion, and adjusts, based on the second nonlinearities calculated in said second nonlinearity calculation unit, the expected values set in said expected value setting unit with respect to a sampled value at the sampling point next to the detected portion of the readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency.

According to the above-described system, the expected values with respect to the sampled value of the portion of the readout signal detected as the nonlinear portion is adjusted based on the first nonlinearities, and the expected values with respect to the sampled value at the sampling point next to the portion of the readout signal detected as the nonlinear portion is adjusted based on the second nonlinearities smaller than the above first nonlinearities, thus allowing a data reproduction with higher accuracy.

BRIEF DESCRIPTION OF THE DRAWINGS

Other objects, features, and advantages of the present invention will become more apparent from the following detailed description when read in conjunction with the accompanying drawings, in which:

FIG. 5 is a diagram showing a relation between state transitions and expected values in a recording of data with a PR waveform of a constraint length 4;

BEST MODE FOR CARRYING OUT THE INVENTION

Next, a description will be given of an embodiment of the present invention with reference to the accompanying drawings.

Figure 3:
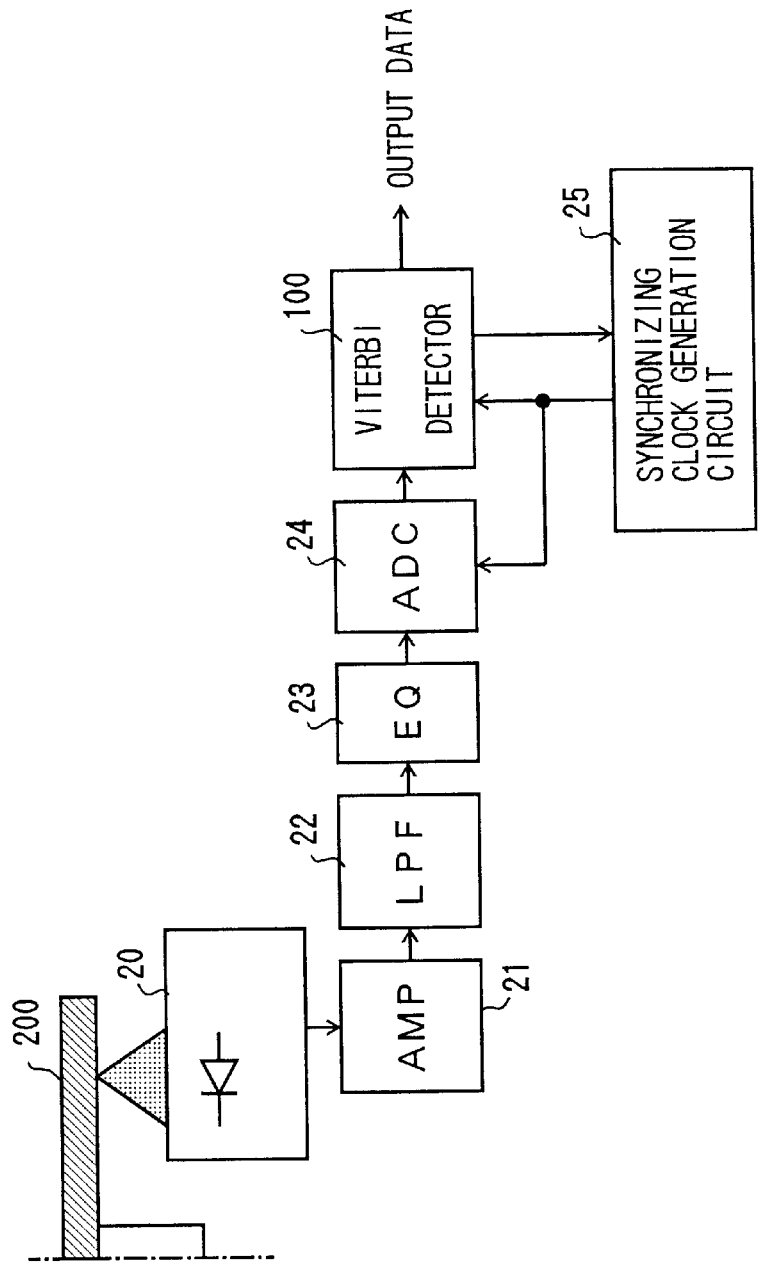
FIG. 3 is a block diagram showing a structure of a data reproduction system.

FIG. 3 shows a structure of a data reproduction system of a magneto-optical disk apparatus. According to FIG. 3, data is recorded on a magneto-optical disk 200 serving as a magneto-optical recording medium in accordance with, for example, a PR(1, 2, 2, 1) waveform of a constraint length 4. A readout signal corresponding to recorded data is obtained from the magneto-optical disk 200 through an optical head 20. The readout signal is amplified in an amplifier 21 and is subjected to wave shaping in a filter 22 and an equalizer 23. Then, the readout signal is converted into a digital signal in an analog-to-digital converter (ADC) 24. The analog-to-digital converter 24 operates in synchronism with a synchronizing clock signal supplied from a synchronizing clock generation circuit 25. In other words, signal values yt of the above-mentioned readout signal are sampled in synchronism with (or at the frequency of) the synchronizing clock signal.

The sampled signal values (sampled values yt) are supplied in an order sampled to a Viterbi detector 100 in synchronism with the above-mentioned synchronizing clock signal. The Viterbi detector 100 outputs the recorded data after detecting the recorded data from the sampled values of the readout signal in accordance with the Viterbi algorithm. The Viterbi detector 100, as described later, includes the function of detecting the phase error of the synchronizing clock signal. A phase error signal output from the Viterbi detector 100 is supplied to the synchronizing clock generation circuit 25, which generates the synchronizing clock signal using the phase error signal.

Figure 4:
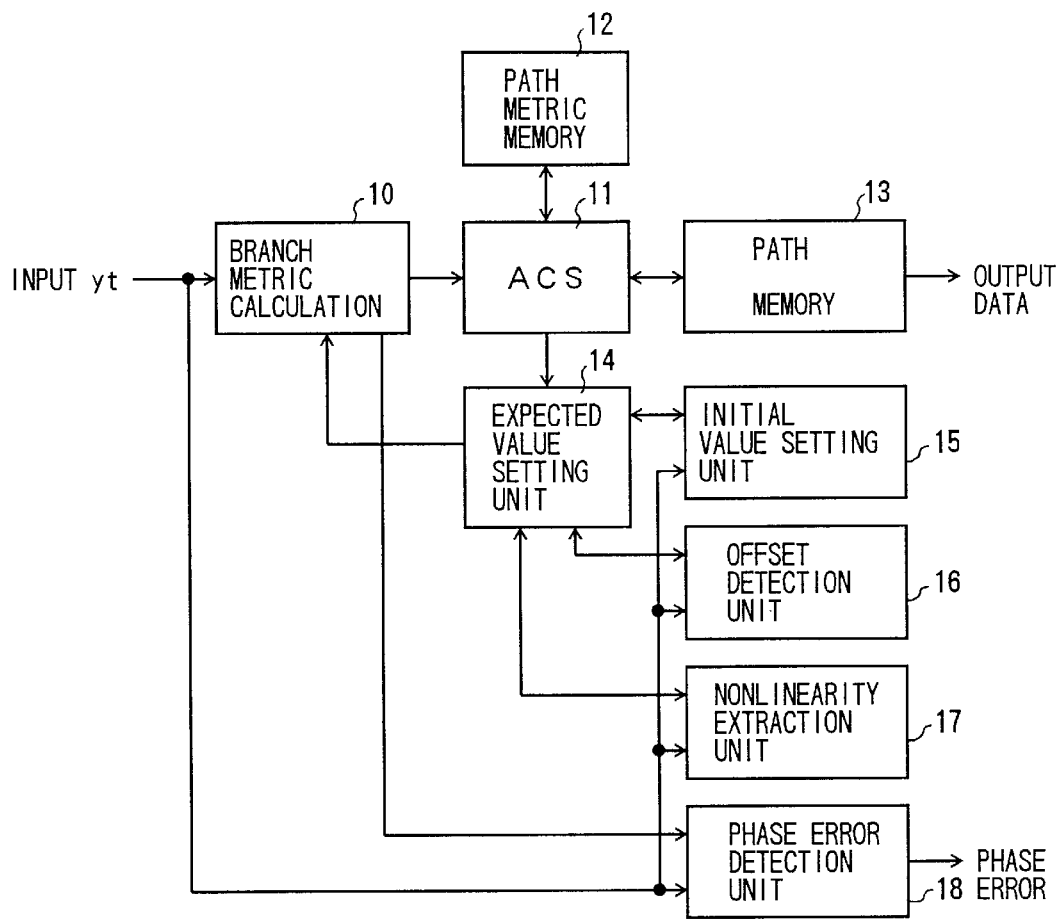
FIG. 4 is a block diagram showing a first structure of a Viterbi detector of the data reproduction system according to an embodiment of the present invention.

The Viterbi detector 100 is structured as shown in FIG. 4.

Figure 1:
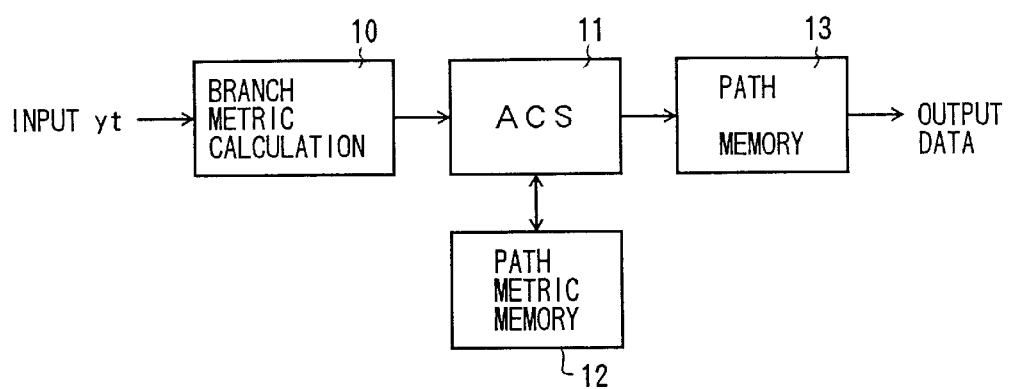
FIG. 1 is a block diagram showing a basic structure of a Viterbi detector.
Figure 2:
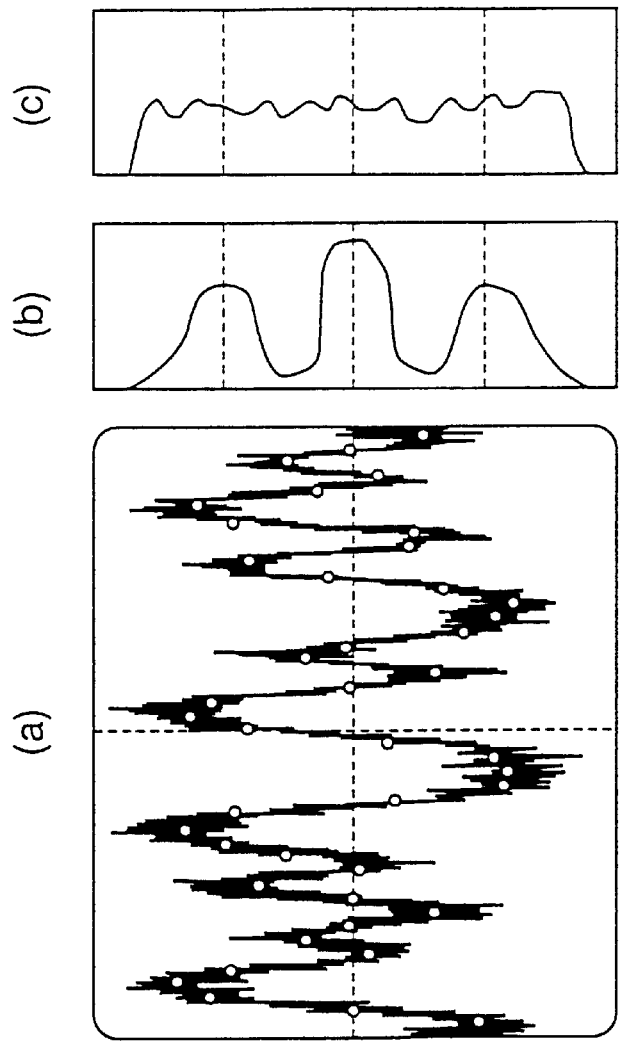
FIG. 2 are diagrams showing a waveform of a readout signal and a distribution of sampled values.

According to FIG. 4, like the generally known Viterbi detector (see FIG. 1), the Viterbi detector 100 includes the branch metric calculation unit 10, the ACS unit 11, the path metric memory 12, and the path memory 13. In addition, the Viterbi detector 100 further includes an expected value setting unit 14, an initial value setting unit 15, an offset detection unit 16, a nonlinearity extraction unit 17 and a phase error detection unit 18.

FIG. 5 shows the relation between the PR of a PR(c, b, a, 1) waveform of a constraint length 4 and expected values. In this case, the number N of possible states is eight (S0, S1, S2, S3, S4, S5, S6, S7), while the number of the expected values to be taken is 16 (P0, P1, P2, P3, P4, P5, P6, P7, P8, P9, P10, P11, P12, P13, P14, P15). The transition from the state S0 to the state S0 corresponds to the expected value P0=0, and the transition from the state S0 to the state S4 corresponds to the expected value P8=1. The transition from the state S1 to the state S0 corresponds to the expected value P1=c, and the transition from the state S1 to the state S4 corresponds to the expected value P9=(1+c). The transition from the state S2 to the state S1 corresponds to the expected value P2=b, and the transition from the state S2 to the state S5 corresponds to the expected value P10=(1+b). The transition from the state S3 to the state S1 corresponds to the expected value P3=(b+c), and the transition from the state S3 to the state S5 corresponds to the expected value P11= (1+b+c). The transition from the state S4 to the state S2 corresponds to the expected value P4=a, and the transition from the state S4 to the state S6 corresponds to the expected value P12=(1+a). The transition from the state S5 to the state S2 corresponds to the expected value P5=a+c, and the transition from the state S5 to the state S6 corresponds to the expected value P13=(1+a+c). The transition from the state S6 to the state S3 corresponds to the expected value P6=a+b, and the transition from the state S6 to the state S7 corresponds to the expected value P14=(1+a+b). The transition from the state S7 to the state S3 corresponds to the expected value P7=a+b+c, and the transition from the state S7 to the state S7 corresponds to the expected value P15=(1+a+b+c).

Figure 6:
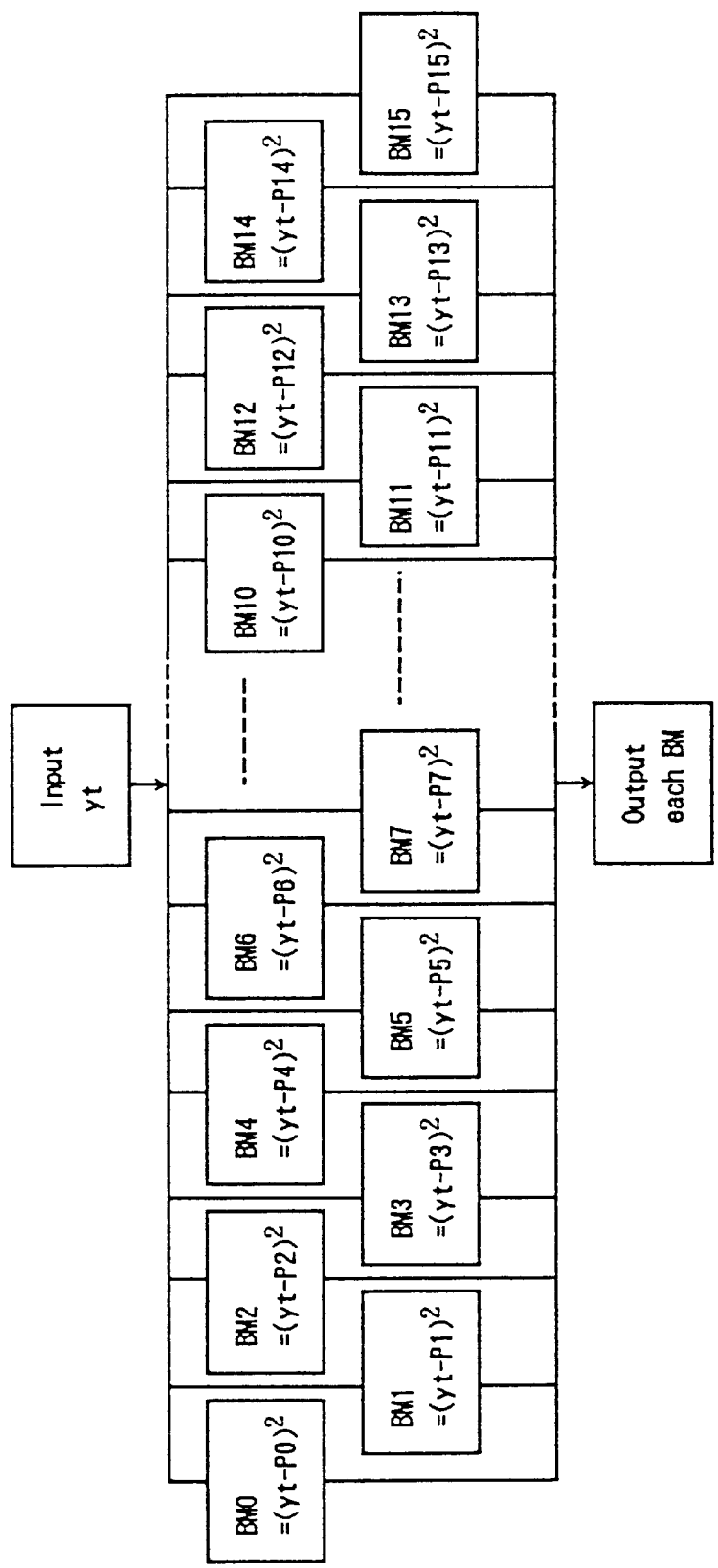
FIG. 6 is a flowchart of a process performed in a branch metric calculation unit of the Viterbi detector.

The above-described branch metric calculation unit 10, as previously described, calculates branch metrics each corresponding to a difference between a sampled value and each of expected values. Specifically, as shown in FIG. 6, once a sampled value yt is given, the branch metric calculation unit 10 calculates as branch metrics BMh (h=0 through 16) the squares $(yt-Ph)^2$ of the respective differences between the sampled value yt and the above-described 16 expected values Ph. The 16 branch metrics BM0 through BM15 are supplied to the ACS unit 11. Here, each of the branch metrics BMh is defined as the square of the difference between the given sampled value yt and each of the expected values Ph. However, Viterbi detection can be performed similarly by employing the absolute value of each of the above-mentioned differences as a branch metric.

Figure 7:
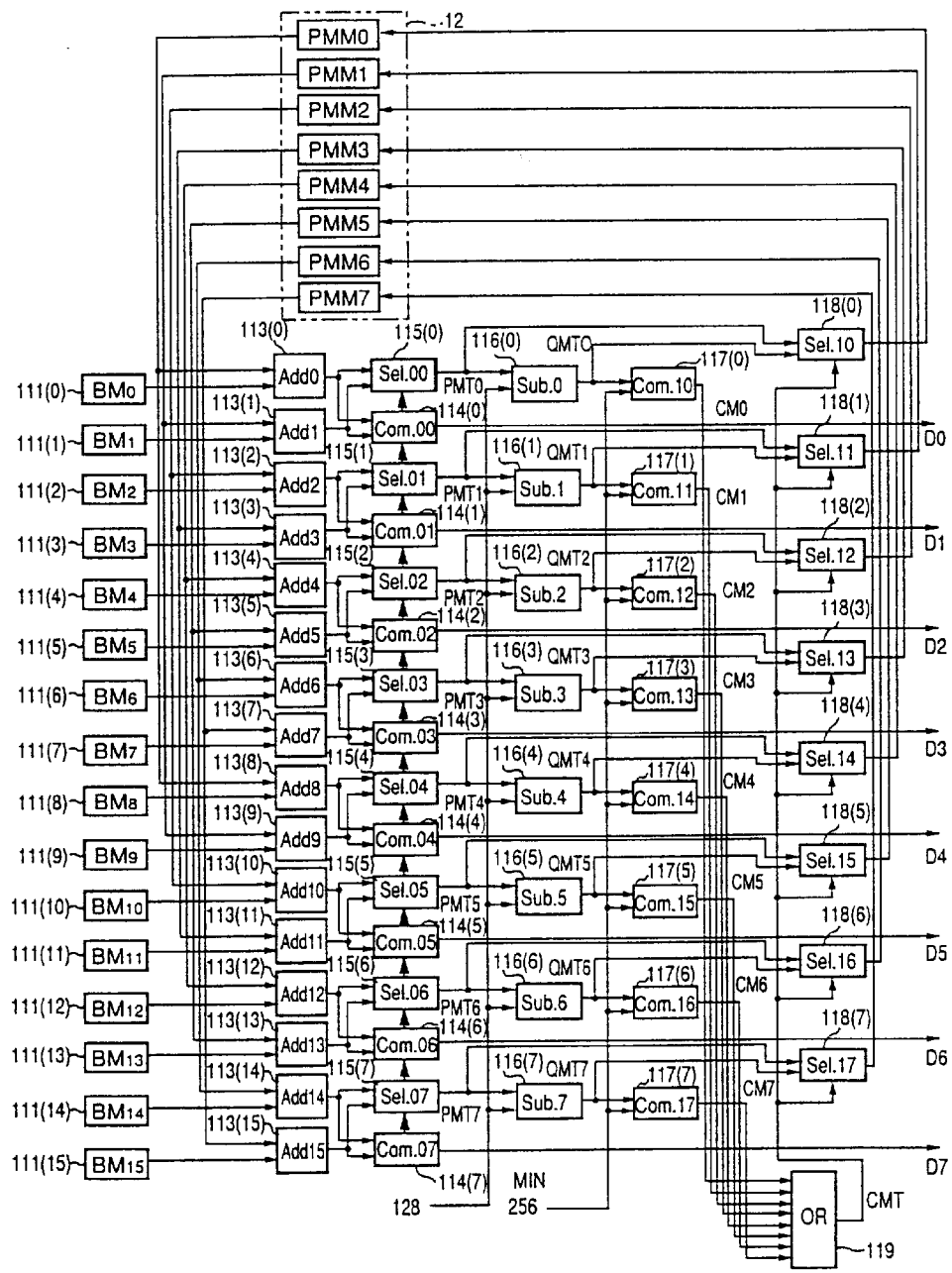
FIG. 7 is a block diagram showing structures of an ACS unit and a path metric memory of the Viterbi detector.

The ACS unit 11, which performs a series of calculations of "addition", "comparison" and "selection" as described above, has a structure as shown in FIG. 7. According to FIG. 7, the ACS unit 11 includes 16 registers 111(0) through 111(15), in which the above-described 16 branch metrics BM0 through BM15 are set, respectively, 16 adders 113(0) through 113(15), eight comparators 114(0) through 114(7) and eight selectors 115(0) through 115(7).

The adder 113(0) adds the BM0(t) and a path metric PMM0(t−1) of the previous sampling timing, which is stored in the path metric memory 12. The adder 113(1) adds the BM1(t) and a path metric PMM1(t−1) of the previous sampling timing, which is stored in the path metric memory 12. The comparator 114(0) compares an output value (BM0 (t)+PMM0(t−1)) of the adder 113(0) and an output value (BM1(t)+PMM1(t−1)) of the adder 113(1). The comparator 114(0) outputs "1" if the output value (BM0(t)+PMM0(t−1)) is smaller than the output value (BM1(t)+PMM1(t−1)), and outputs "0" if the output value (BM1(t)+PMM1(t−1)) is smaller than the output value (BM0(t)+PMM0(t−1)). The output value ("0" or "1") of the comparator 114(0) becomes an output value D0 of the ACS unit 11.

The selector 115(0) selects the smaller of the output values (BM0(t)+PMM0(t−1)) of the adder 113(0) and (BM1 (t)+PMM1(t−1)) of the adder 113(1), depending on the output value of the comparator 114(0), and outputs the selected value PMT0.

The output value (BM0(t)+PMM0(t−1)) obtained by adding the above-described branch metric BM0(t) and the PMM0(t−1) of the previous sampling timing corresponds to the transition from the state S0 to the state S0, and the output value (BM1(t)+PMM1(t−1)) obtained by adding the branch metric BM1(t) and the path metric PMM1(t−1) of the previous sampling timing corresponds to the transition from the state S1 to the state S0 (see FIG. 5). Therefore, the function of the selector 115(0) to select the smaller of the two output values corresponds to the selection of a path having the smaller path metric (or more likelihood) from two incoming paths to the state S0.

The adders 113(2) and 113(3), the comparator 114(1) and the selector 115(1) perform the same process as described above by using the branch metrics BM2(t) and BM3(t), and path metrics PMM2(t−1) and PMM3(t−1) of the previous sampling timing. The adders 113(4) and 113(5), the comparator 114(2) and the selector 115(2) perform the same process as described above by using the branch metrics BM4(t) and BM5(t), and path metrics PMM4(t−1) and PMM5(t−1) of the previous sampling timing. The adders 113(6) and 113(7), the comparator 114(3) and the selector 115(3) perform the same process as described above by using the branch metrics BM6(t) and BM7(t), and path metrics PMM6(t−1) and PMM7(t−1) of the previous sampling timing. As a result, the output values (each "0" or "1") of the comparators 114(1) through 114(3) become output values D1 through D3 of the ACS unit 11, respectively.

The adders 113(8) and 113(9), the comparator 114(4) and the selector 115(4) perform the same process as described above by using the branch metrics BM8(t) and BM9(t), and the path metrics PMM0(t−1) and PMM1(t−1) of the previous sampling timing. The adders 113(10) and 113(11), the comparator 114(5) and the selector 115(5) perform the same process as described above by using the branch metrics BM10(t) and BM11(t), and the path metrics PMM2(t−1) and PMM3(t−1) of the previous sampling timing. The adders 113(12) and 113(13), the comparator 114(6) and the selector 115(6) perform the same process as described above by using the branch metrics BM12(t) and BM13(t), and the path metrics PMM4(t−1) and PMM5(t−1) of the previous sampling timing. The adders 113(14) and 113(15), the comparator 114(7) and the selector 115(7) perform the same process as described above by using the branch metrics BM14(t) and BM15(t), and the path metrics PMM6(t−1) and PMM7(t−1) of the previous sampling timing. As a result, the output values (each "0" or "1") of the comparators 114(4) through 114(7) become output values D4 through D7 of the ACS unit 11, respectively.

The ACS unit 11 further includes subtracters 116(0) through 116(7), comparators 117(0) through 117(7) and selectors 118(0) through 118(7) in correspondence with the respective selectors 115(0) through 115(7), and an OR circuit 119. The subtracters 116(i) (i=0 through 7) subtract a constant (128)d (a decimal number) from respective output values PMTi of the corresponding selectors 115(i). The constant is half of a value expressed in a full scale of 8 bits. The comparators 117(i) compare respective output values QMTi of the corresponding subtracters 116(i) and a minimum reference value MIN (=−256), and output respective comparison results CMi. The minimum reference value MIN serves as a reference value by which it is judged whether the respective output values QMTi of the subtracters 116(i) have underflows.

The comparison results CMi of the respective comparators 117(i) each become, for example, a high level when the respective output values QMTi of the corresponding subtracters 116(i) are below the minimum reference value MIN. The comparison results CM0 through CM7 of the respective comparators 117(0) through 117(7) are input to the OR circuit 119. The selectors 118(i) select the respective output values PMTi of the corresponding selectors 115(i) or the respective output values QMTi of the corresponding subtracters 116(i), depending on the level of an output CMT of the OR circuit 119. Output values of the selectors 118(i) are stored in the path metric memory 12 as corresponding path metrics PMMi(t). The path metrics PMMi(t) stored in the path metric memory 12 are used for the calculation of next path metrics PMMi(t+1) (or path metrics PMMi(t+1) of next sampling timing). According to the above-described circuit structure, when the level of the output CMT of the OR circuit 119 is low (or the respective output values QMTi of the corresponding subtracters 116(i) are above the minimum reference value MIN), the selectors 118(i) supply the respective output values QMTi of the corresponding subtracters 116(i) to the path metric memory 12 as new path metrics PMMi(t).

As described above, the additions of the path metrics and the branch metrics are repeated by using the new path metrics (the output values of the subtracter 116(i)) obtained by subtracting the constant value (=128) from the respective sums of the path metrics and branch metrics. On the other hand, during the calculation process, the sums of the path metrics and branch metrics (from each of which the constant value is not subtracted) are defined as the new path metrics when the differences obtained by subtracting the constant value from the respective sums of the path metrics and branch metrics are below the minimum reference value MIN (−256). Therefore, the path metrics, which increase every time the corresponding branch metrics are added thereto, are prevented from having overflows or underflows.

The output values D0 through D7 of the above-described ACS unit 11 are supplied to the path memory 13. In the path memory 13, as described above, the data corresponding to the paths selected in the ACS unit 11 is shifted, while the data corresponding to the non-selected paths is discarded, so that the data corresponding to the surviving path is output from the path memory 13 as the detected data. The path memory 13 has a structure as shown in FIG. 8.

Figure 8:
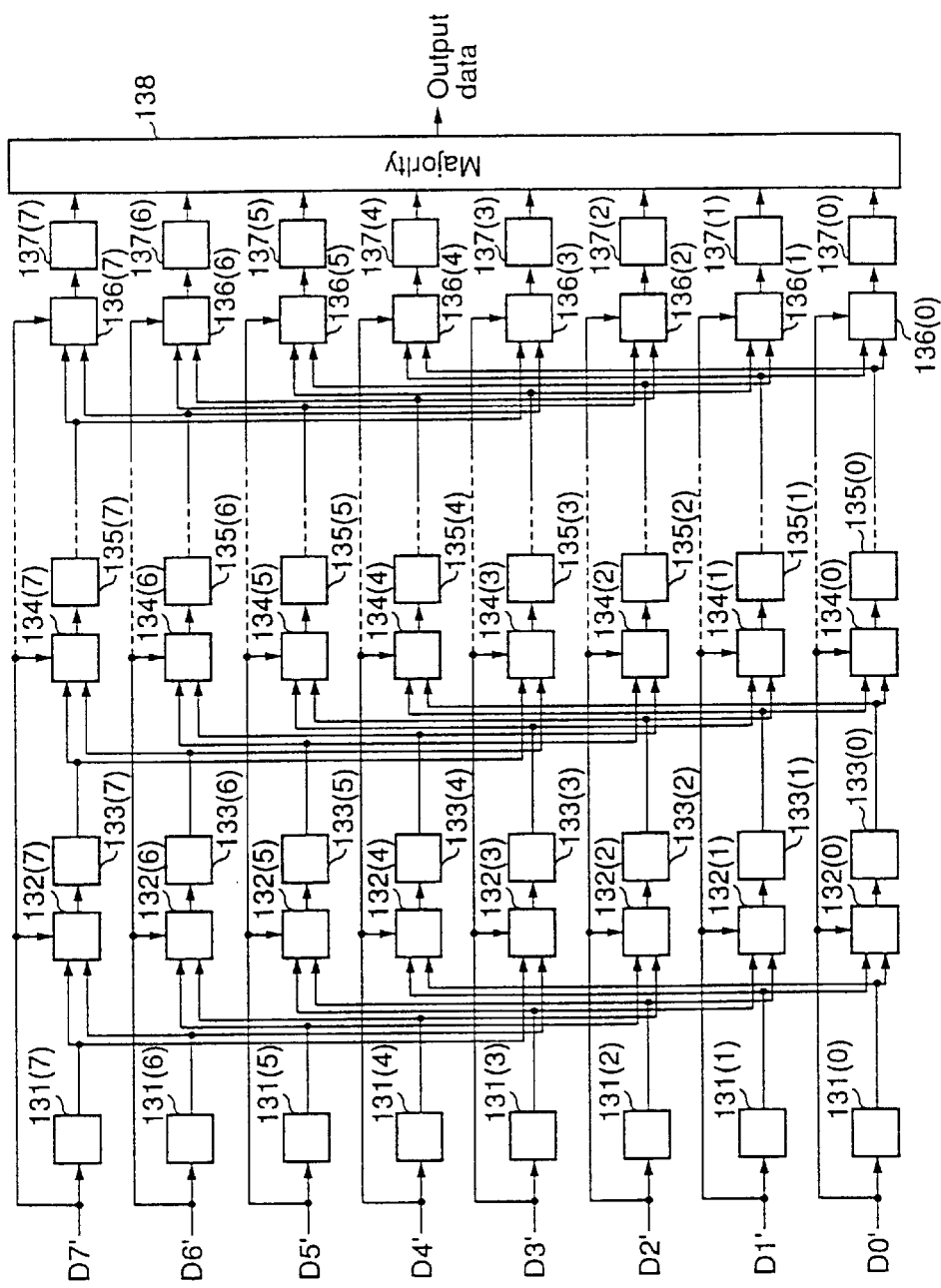
FIG. 8 is a block diagram showing a structure of a path memory of the Viterbi detector.

According to FIG. 8, the path memory 13 includes flip-flops 131(0) through 131(7), in which the data D0 through D7 from the ACS unit 11 are set in parallel with one another, selectors 132(0) through 132(7), flip-flops 133(0) through 133(7), selectors 134(0) through 134(7), flip-flops 135(0) through 135(7), . . . selectors 136(0) through 136(7), flip-flops 137(0) through 137(7) and a majority selection unit 138.

The above-mentioned flip-flops and selectors are alternately connected so that an output of each of the flip-flops of a given stage is input to a given pair of the selectors which are connected to the respective flip-flops of the given stage. Data set in the flip-flops, which start with the data D0 through D7 corresponding to the selected paths and are set in the respective flip-flops 131(0) through 131(7) of the first stage, are replaced by the data corresponding to the surviving paths during the repetition of the selection and shifting processes. The majority of the data (each "0" or "1") set in the flip-flops 137(0) through 137(7) of the last stage is selected in the majority selection unit 138 and is output from the path memory 13.

Next, a description will be given of the expected value setting unit 14 of FIG. 4.

The expected value setting unit 14 is connected to the initial value setting unit 15, the offset detection unit 16 and the nonlinearity extraction unit 17. The expected value setting unit 14 determines the expected values based on an offset Init from the initial value setting unit 15, a detected offset Offset from the offset detection unit 16 and a nonlinearity {NLh} from the nonlinearity extraction unit 17. The expected value setting unit 14 is structured, for example, as shown in FIG. 9.

Figure 9:
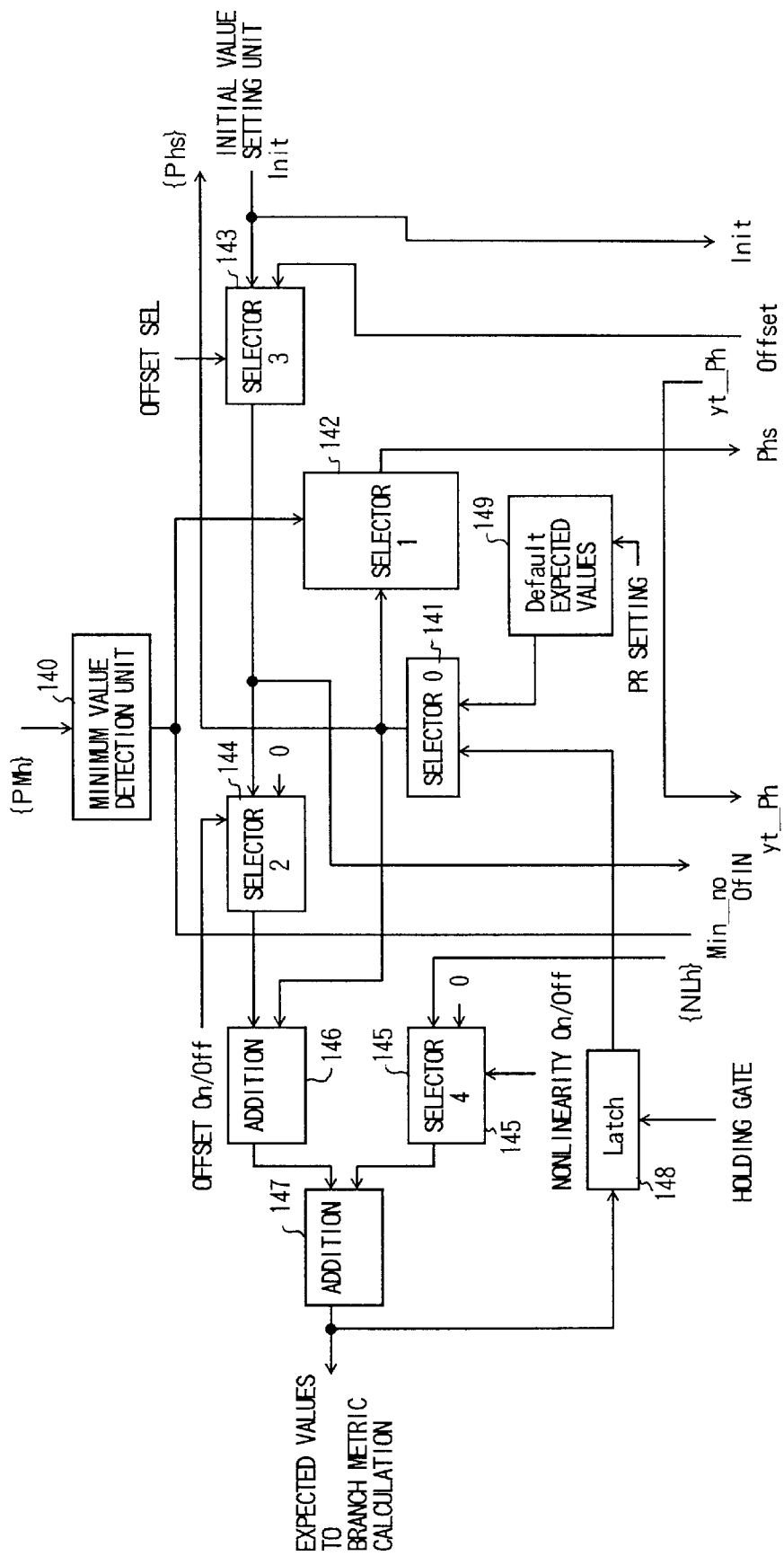
FIG. 9 is a block diagram showing a structure of an expected value setting unit of the Viterbi detector.
Figure 10:
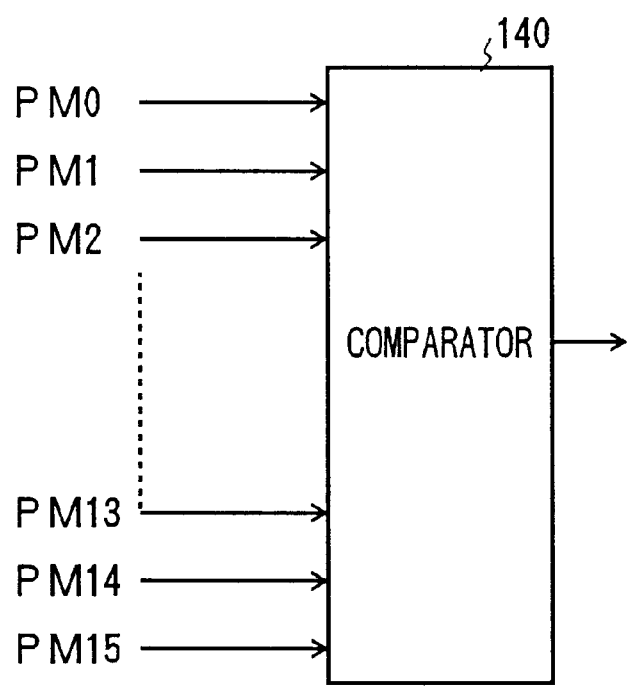
FIG. 10 is a block diagram showing a minimum value detection unit (comparator) of the expected value setting unit.

According to FIG. 9, the expected value setting unit 14 includes a minimum value detection unit 140, selectors 141 through 145, adders 146 and 147, a latch-circuit 148 and a default expected value setting unit 149. The minimum value detection unit 140 detects the minimum value of the path metrics {PMh} calculated in the ACS unit 11. As previously described, in the case of the PR waveform of the constraint length 4, there are the 16 path metrics {PMh} (h=0 through 15) (or the outputs of the adders 113(0) through 113(15) in FIG. 7), and the output of the minimum value detection unit 140 is given in 16 bits so that the bits correspond to the respective path metrics. That is to say, when the path metrics PM0 through PM15 are input to the minimum value detection unit 140 (a comparator) as shown in FIG. 10, the minimum value detection unit 140 outputs "0000000000000001" when the PM0 is the minimum value, "0000000000000010" when the PM1 is the minimum value, "000000000000100" when the PM2 is the minimum value, . . . , "0010000000000000" when the PM13 is the minimum value, "0100000000000000" when the PM14 is the minimum value and "1000000000000000" when the PM15 is the minimum value.

The output of the minimum value detection unit 140 is supplied, as a Min_no signal, to the nonlinearity extraction unit 17 having a below-described structure, while employed as a control signal to the selector 142. The selector 142 selects a default expected value corresponding to the control signal (the output Min_no of the minimum value detection unit 140) out of default expected values supplied from the default expected value setting unit 149 via the selector 141. There are 16 ideal expected values, which are determined by the PR waveform employed during the recording of the data, set in the default expected value setting unit 149. The default expected value Phs selected in the selector 142 is supplied to the offset detection unit 16 having a below-described structure.

The default expected values set in the default expected value setting unit 149 are also supplied to the initial value setting unit 15 having a below-described structure via the selector 141. The initial offset Init set by the initial value setting unit 15 is input to the selector 143. The offset Offset detected in the offset detection unit 16 is also input to the selector 143, in which the initial offset Init is switched to the offset Offset at a predetermined timing by a selection signal (offset SEL). The output of the selector 143 is supplied to the selector 144, and to the nonlinearity extraction unit 17 as an OfIN signal. The selector 144, which determines whether to correct the expected values by using an offset (that is, to perform an offset operation), selects the offset (Init or Offset) selected in the selector 143 or "0" based on an offset On/Off signal.

The output of the selector 144 is supplied to the adder 146, to which the default expected values {Phs} are supplied via the selector 141. In the adder 146, the offset (Init or Offset) output from the selector 144 is added to the respective default expected values {Phs}. The selector 145, which determines whether to correct the expected values by using the nonlinearity {NLh} extracted in the nonlinearity extraction unit 17, selects the nonlinearity {NLh} or "0" based on a nonlinearity On/Off signal. The adder 147 adds the output values of the adder 146 and the selector 145. The adder 147 outputs the expected values corrected by, at least, one of the offset (Init or Offset) and the nonlinearity {NLh}. If both of the selectors 144 and 145 select "0", the default expected values are output from the adder 147 without correction. The expected values output from the adder 147 are supplied to the above-described branch metric calculation unit 10 for the calculation of the path metrics.

The expected values supplied to the branch metric calculation unit 10 are held in the latch circuit 148 by the control of the holding gate. The last expected values of a previous sector held in the latch circuit 148 can be selected as the default expected values for the next sector by the selector 141.

When a signal is read from a magneto-optical disk, there occurs a phenomenon that the readout signal is offset immediately after the start of the reproduction. The initial value setting unit 15, which sets the offset Init of the readout signal in the beginning of the reproduction, has a structure as shown in FIG. 11.

Figure 11:
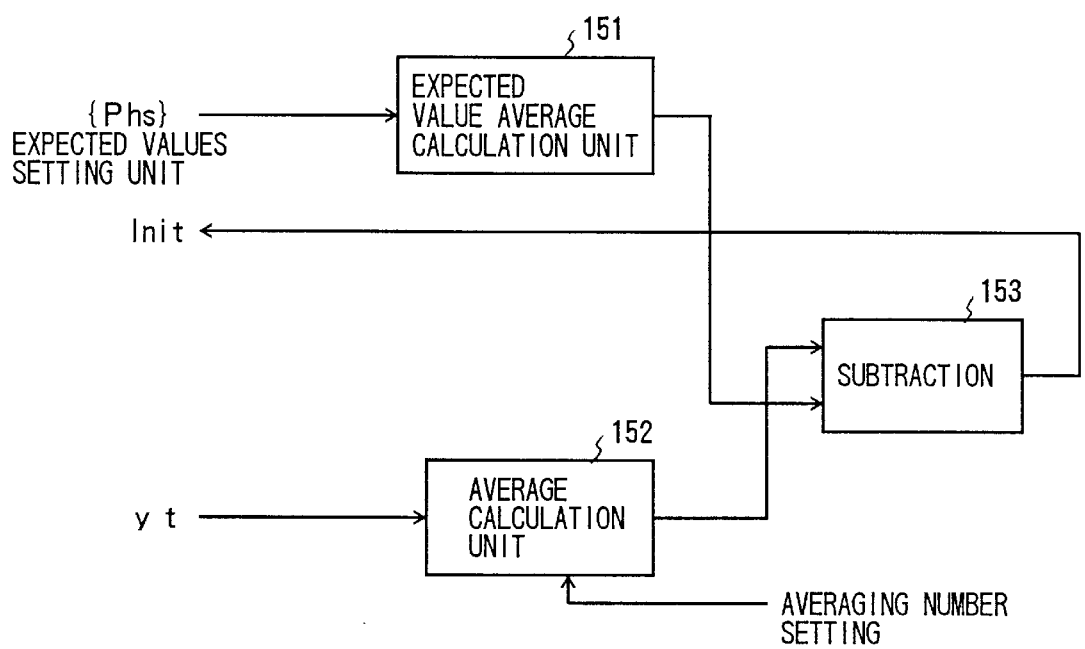
FIG. 11 is a block diagram showing a structure of an initial value setting unit of the Viterbi detector.

According to FIG. 11, the initial value setting unit 15 includes an expected value average calculation unit 151, a sampled value average calculation unit 152 and a subtracter 153. The expected value average calculation unit 151 calculates the average of the default expected values {Phs} supplied from the expected value setting unit 14. The sampled values yt are supplied to the initial value setting unit 15, and every time a new sampled value yt is obtained, the sampled value average calculation unit 152 calculates the average of the sampled values yt obtained by then. The subtracter 153 calculates a difference between the average of the expected values Phs and the average of the sampled values yt so as to output the difference as the initial offset Init. The initial offset Init, as described above, is supplied to the expected value setting unit 14.

Figure 12:
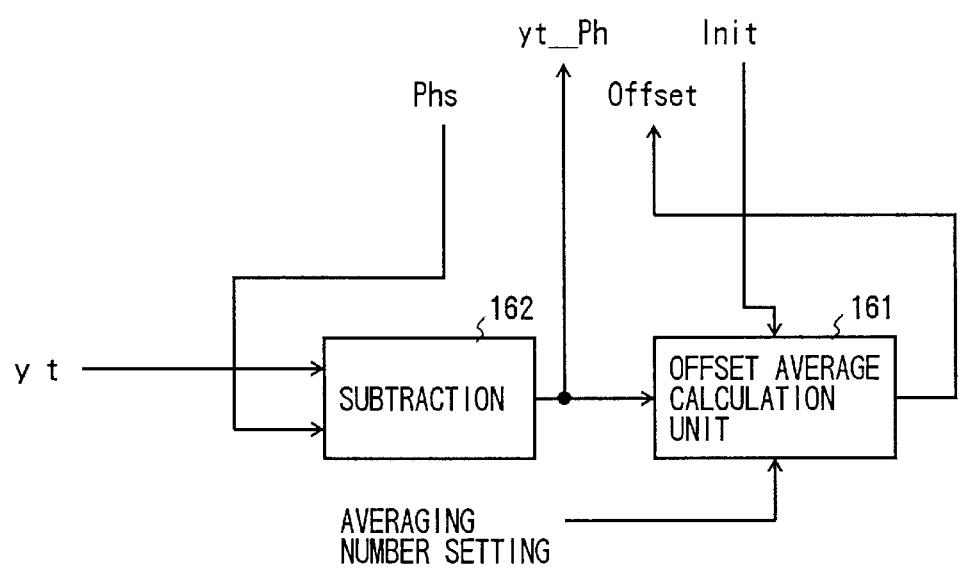
FIG. 12 is a block diagram showing a structure of an offset detection unit of the Viterbi detector.

The offset detection unit 16, which detects the offset Offset of the steady readout signal, has a structure as shown in FIG. 12.

According to FIG. 12, the offset detection unit includes an offset average calculation unit 161 and a subtracter 162. The subtracter 162 calculates a difference yt_Phs between a sampled value yt and a corresponding expected value Phs supplied from the expected value setting unit 14. Every time the above-described differences yt_Phs of a predetermined number (averaging number) are obtained, the offset average calculation unit calculates the average of the differences. The offset Init from the initial value calculation unit 15 is employed as the initial value of the calculation of the average. The average calculated in the offset average calculation unit 161 is supplied to the expected value setting unit 14 as the offset Offset.

Figure 13:
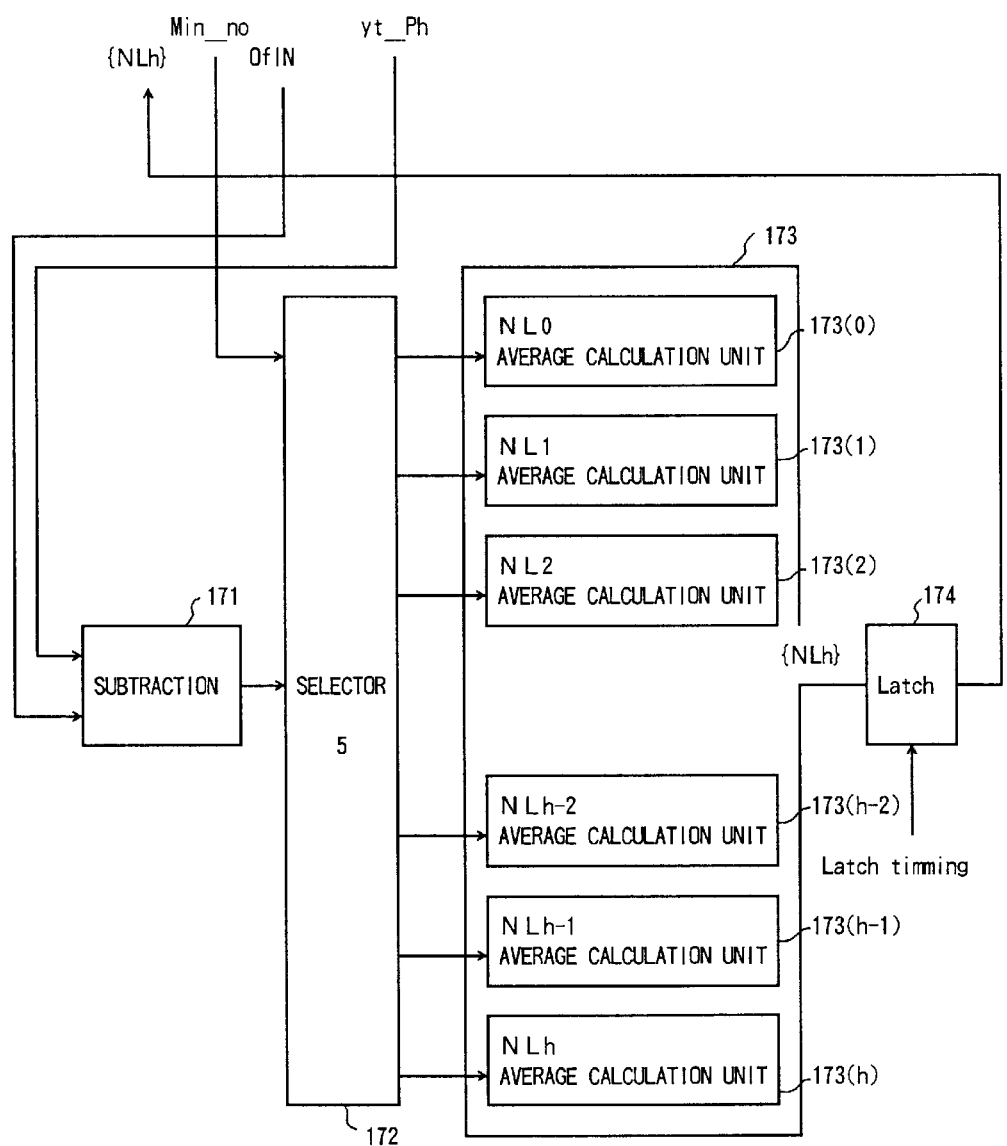
FIG. 13 is a block diagram showing a structure of a nonlinearity extraction unit of the Viterbi detector.

The nonlinearity extraction unit 17, which calculates a nonlinear torsion component (nonlinearity) resulting from the combination of the optical head 20 and the magneto-optical disk 200, has a structure as shown in FIG. 13.

According to FIG. 13, the nonlinearity extraction unit 17 includes a subtracter 171, a selector 172, an average calculation circuit 173 and a latch circuit 174. The nonlinearity extraction unit 17 is supplied with the Min_no signal to specify the minimum path metric and with the offset OfIN (Init or Offset) from the expected value setting unit 14. The difference yt_Ph between the sampled value yt and the corresponding expected value is also supplied from the offset detection unit 16 (see FIG. 12) to the nonlinearity extraction unit 17 via the expected value setting unit 14. The subtracter 171 calculates the difference between the above-mentioned offset OfIN and the difference yt_Ph, and supplies the calculated value to the selector 172. The output of the subtracter 171, which is equal to the difference between the offset OfIN and the difference between the sampled value yt and the corresponding expected value, corresponds to the difference component other than the offset (nonlinear torsion component) between the sampled value and the corresponding expected value.

The average calculation circuit 173 includes average calculation units 173(0) through 173(h) (h=15) corresponding to the respective expected values. The selector 172 assigns the output value (nonlinearity component) of the subtracter 171 to a corresponding one of the average calculation units 173(i) in the average calculation circuit 173 in accordance with the Min _no signal supplied from the expected value setting unit 14. In other words, the Min_no signal (given in one of "0000000000000001" through "1000000000000000") corresponds to each of the expected values as previously described, and the output value of the subtracter 171 corresponding to one of the expected values Ph (yt−Ph) is supplied to one of the average calculation units 173(i) (i=0 through h) corresponding to the one of the expected values.

Each of the average calculation units 173(i) calculates the average NLi of the difference components other than the offset (nonlinearity components) between the corresponding expected value and the respective sampled values. Each of the average calculation units 173(0) through 173(h) calculates the average based on the input values of a predetermined averaging number. Each of the averages NLi output from the average calculation circuit 173 is held in the latch circuit 174 at a predetermined timing, and each of the held averages NLi (nonlinearities) is supplied to the expected value setting unit 14 as previously described.

The sampled values yt of the readout signal, as shown in FIG. 3, are obtained in synchronism with the clock signal generated in the synchronizing clock generation circuit 25. The synchronizing clock generation circuit 25 generates the clock signal based on the phase error signal supplied from the Viterbi detector 100. The phase error signal is generated in the phase error detection unit 18 shown in FIG. 4. The phase error detection unit 18 has a structure as shown in FIG. 14.

Figure 14:
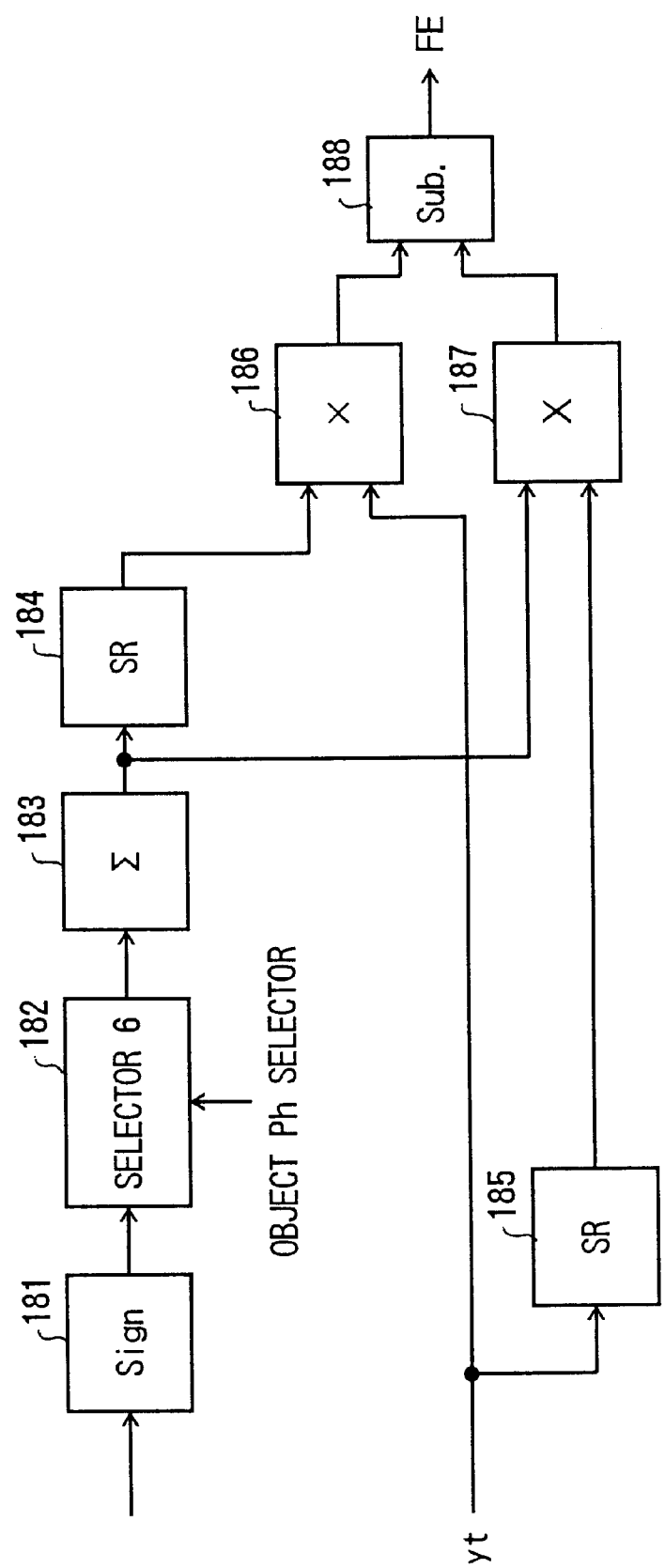
FIG. 14 is a block diagram showing a structure of a phase error detection unit of the Viterbi detector.

According to FIG. 14, the phase error detection unit 18 includes a sign detector (Sign) 181, a selector 182, a cumulative adder (Σ) 183, shift registers (SR) 184 and 185, multipliers 186 and 187, and a subtracter 188. The difference data yt_Ph showing the differences between the sampled value yt and the respective expected values Ph are supplied from the branch metric calculation unit 10 (see FIG. 4) to the sign detector 181 of the phase error detection unit 18. The sign detector 181 outputs a sign value "+1" if the sign of the supplied difference data yt_Ph is positive, a sign value "−1" if the sign thereof is negative and a sign value "0" if the supplied difference data yt_Ph is equal to zero. The selector 182, in accordance with an object selector signal, selects the sign of the difference data yt_Ph corresponding to one of the 16 expected values obtained at a timing with which synchronization should be established. The cumulative adder 183 adds up the sign values supplied via the selector 182 to obtain a cumulative value thereof. The cumulative value is stored in the shift register 184. The cumulative value of the sign values corresponds to the differences between the sampled values and the corresponding expected values (values should be sampled), namely, a phase difference from the ideal waveform of the readout signal.

The cumulative value stored in the shift register 184 at the previous sampling timing is multiplied by the sampled value yt in the multiplier 186. The cumulative value output from the cumulative adder 183 is multiplied, in the multiplier 187, by a sampled value yt−1 stored in the shift register 185 at the previous sampling timing. The subtracter 188 calculates a difference between outputs of the multipliers 186 and 187 so as to output the difference as a phase error PE.

Figure 15:
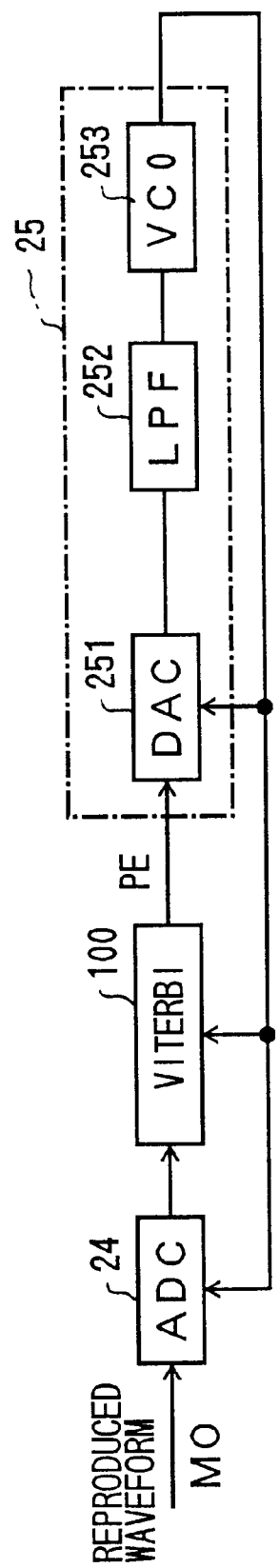
FIG. 15 is a block diagram showing a first structure of a synchronizing clock generation circuit.

The synchronizing clock generation circuit 25, which generates the synchronizing clock signal based on the phase error PE, has a structure as shown in FIG. 15. According to the structure, the synchronizing clock signal is generated in accordance with a so-called self-clocking method.

According to FIG. 15, the synchronizing clock generation circuit 25 includes a digital-to-analog converter (DAC) 251, a low-pass filter (LPF) 252 and a voltage-controlled oscillator (VCO) 253. According to this structure, the phase error PE obtained from the Viterbi detector 100 is converted into an analog signal level by the digital-to-analog converter 251 and is smoothed by the low-pass filter 252. An oscillation frequency is controlled by the VCO control based on the smoothed level. As a result, the synchronizing clock signal (CLK), whose frequency and phase are adjusted so that the readout signal is sampled at the ideal sampling timings, is generated to be supplied to the digital-to-analog converter 251, the Viterbi detector 100 and the analog-to-digital converter 24.

Figure 16:
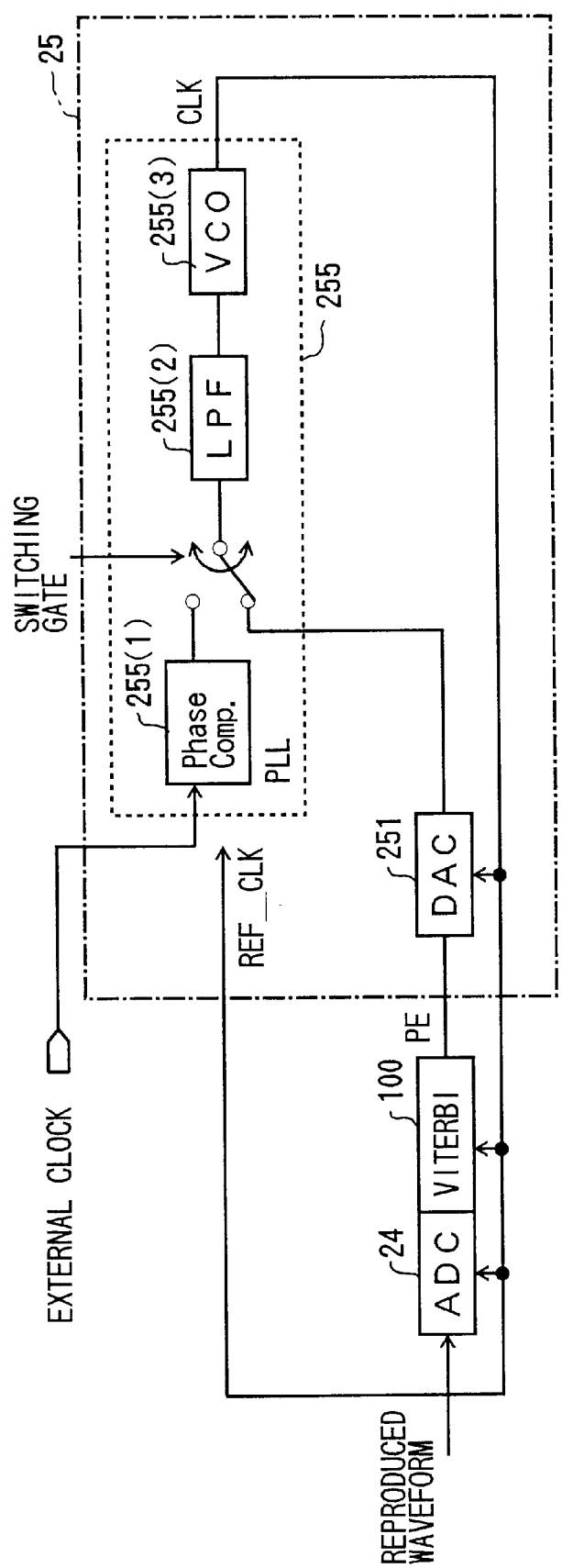
FIG. 16 is a block diagram showing a second structure of the synchronizing clock generation circuit.

The above-described synchronizing clock generation circuit can have another structure as shown in FIG. 16. According to this structure, the synchronizing clock signal is generated in accordance with a so-called external clock method.

According to FIG. 16, the synchronizing clock generation circuit 25 includes the digital-to-analog converter 251 and a PLL circuit 255. The PLL circuit 255 includes a phase comparator 255(1), a low-pass filter 255(2) and a voltage-controlled oscillator 253(3). An external clock signal synchronizing with a clock mark signal is supplied to the phase comparator 255(1) of the PLL circuit.

If two magneto-optical disk drives of the same type employ different circuit elements, each of the phases of the MO signals reproduced in the respective drives does not always correspond to, and in most cases, differs from the phase of the external clock signal. In such cases, ideal sampling timings cannot be obtained without adjusting each of the phases so as to allow a compatibility between the two drives. Therefore, in an MO region, the synchronizing clock signal is generated, in the same way as the above-described self-clocking method, by selecting the phase error PE by using a switching gate. The synchronizing clock signal is supplied to the phase comparator 255(1) as a reference clock (REF_CLK), and the frequency and phase of the synchronizing clock signal are adjusted based on the phase difference between the reference clock and the external clock signal.

Figure 17:
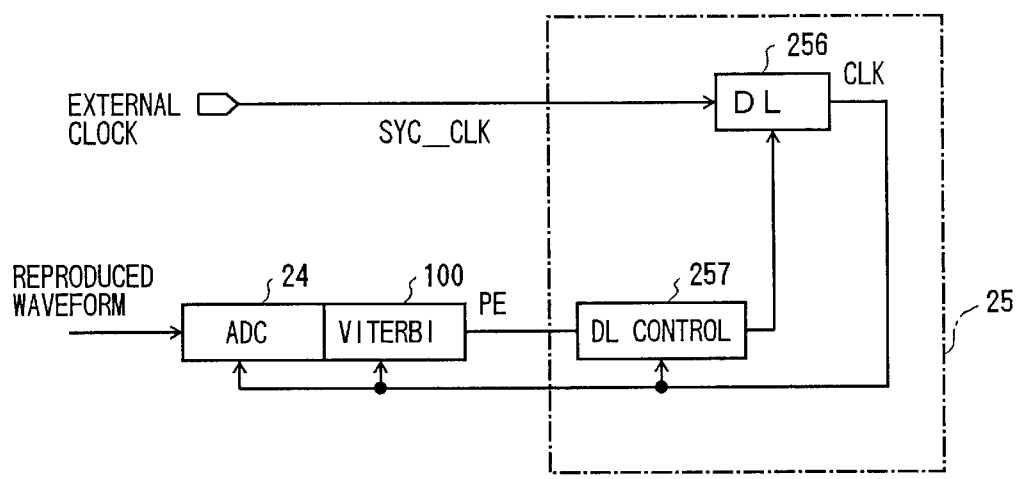
FIG. 17 is a block diagram showing a third structure of the synchronizing clock generation circuit.

The synchronizing clock generation circuit 25 can be structured, for example, as shown in FIG. 17. According to the structure, the synchronizing clock signal is generated without employing the PLL as in the above-described two structures.

According to FIG. 17, the synchronizing clock generation circuit 25 includes a delay circuit 256 and a delay control circuit 257. As in the structure of FIG. 16, the external clock signal (SYN_CLK) synchronizing with clock marks is supplied to the delay circuit 256. The delay control circuit 257 determines a delay time based on the phase error PE output from the Viterbi detector 100. The delay circuit 256 is controlled to have the delay time determined by the delay control circuit 257. The phase of the external clock is adjusted by the delay circuit 256, and is supplied, as the synchronizing clock signal, to the Viterbi detector 100 and the analog-to-digital converter 24 sampling the readout signal.

Figure 18:
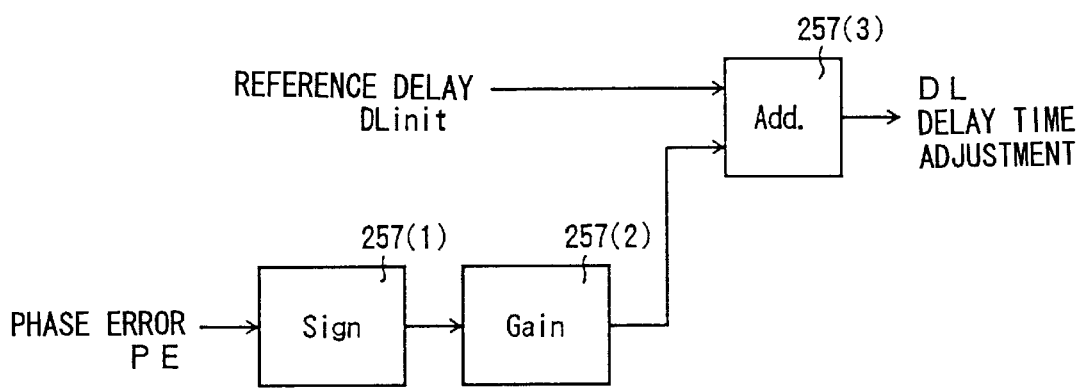
FIG. 18 is a block diagram showing a structure of a delay control circuit used for the synchronizing clock generation circuit of FIG. 17.

The above-described delay control circuit 257 has a structure as shown in FIG. 18.

According to FIG. 18, the delay control circuit 257 includes a sign extraction circuit (Sign) 257(1), a gain adjustment circuit (Gain) 257(2) and an adder 257(3). The sign extraction circuit 257(1) extracts a sign value of the phase error PE supplied from the Viterbi detector 100. The sign value indicates the degree of the lead or lag of the phase. The gain adjustment circuit 257(2) multiplies the sign value by a predetermined gain and supplies the product to the adder 257(3) as a gain-adjusted sign value. The adder 257(3) adds the gain-adjusted sign value to a reference delay (DLiit) to calculate the delay time to be set in the delay circuit 256. The delay control circuit 257 increases the delay time to be set when the phase error PE indicates the phase lead, and decreases the delay time to be set when the phase error PE indicates the phase lag, thus generating the synchronizing clock signal determining the best sampling timings.

Figure 19:
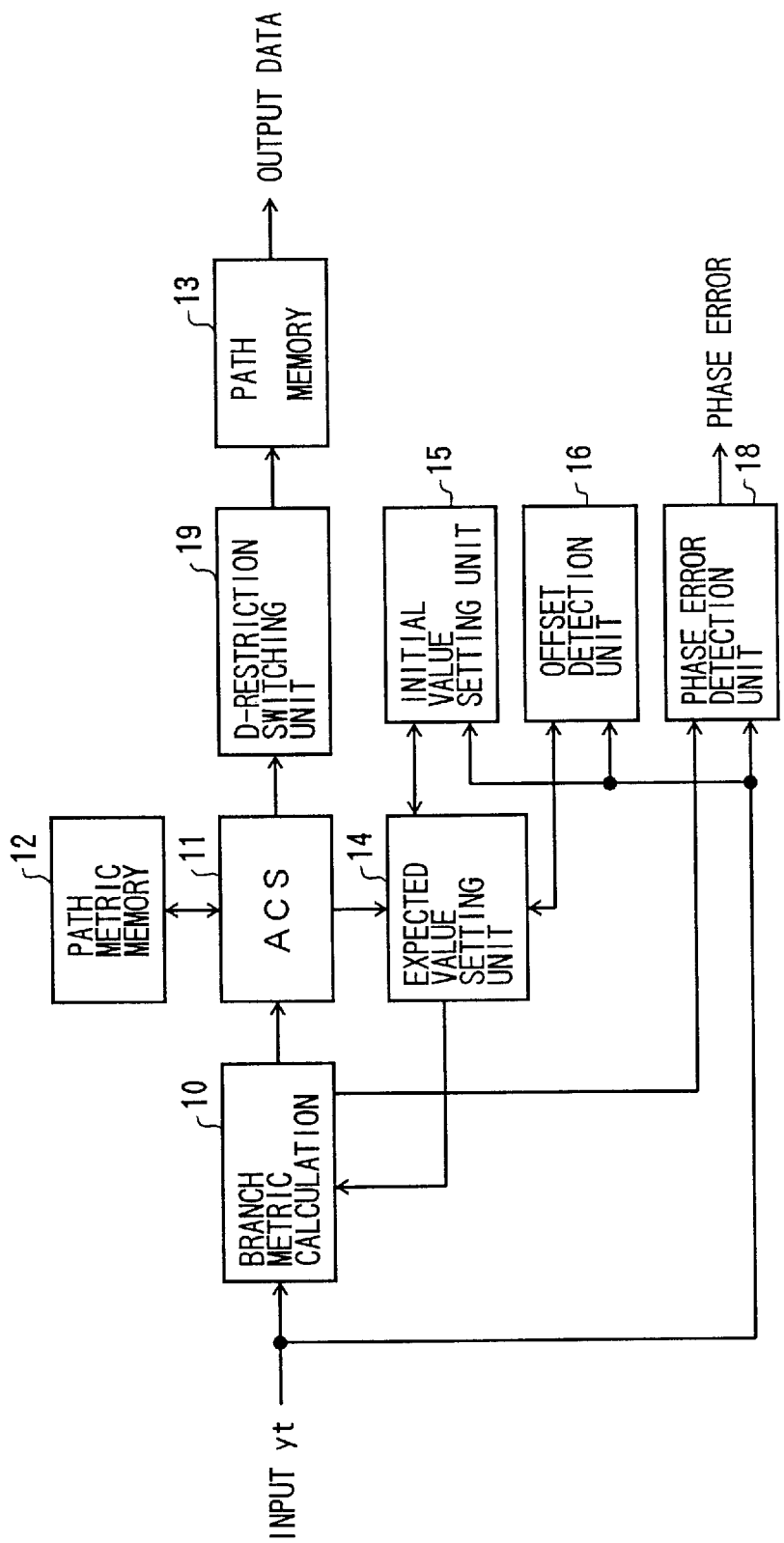
FIG. 19 is a block diagram showing a second structure of the Viterbi detector.

The above-described Viterbi detector 100 can also have a structure as shown in FIG. 19 besides the structure shown in FIG. 4. Compared with the structure of FIG. 4, the structure of FIG. 19 has a D-restriction switching unit 19 connected between the ACS unit 11 and the path memory 13, while removing the nonlinearity extraction unit 17 therefrom.

The above-mentioned D-restriction switching unit 19, by the D-restriction of a run length limit (a 1/7 modulation, a 2/7 modulation, or the like) adopted for data recording, forcibly switches readout data to data corresponding to the adopted run length. The D-restriction switching unit 19 has a structure as shown in FIG. 20.

Figure 20:
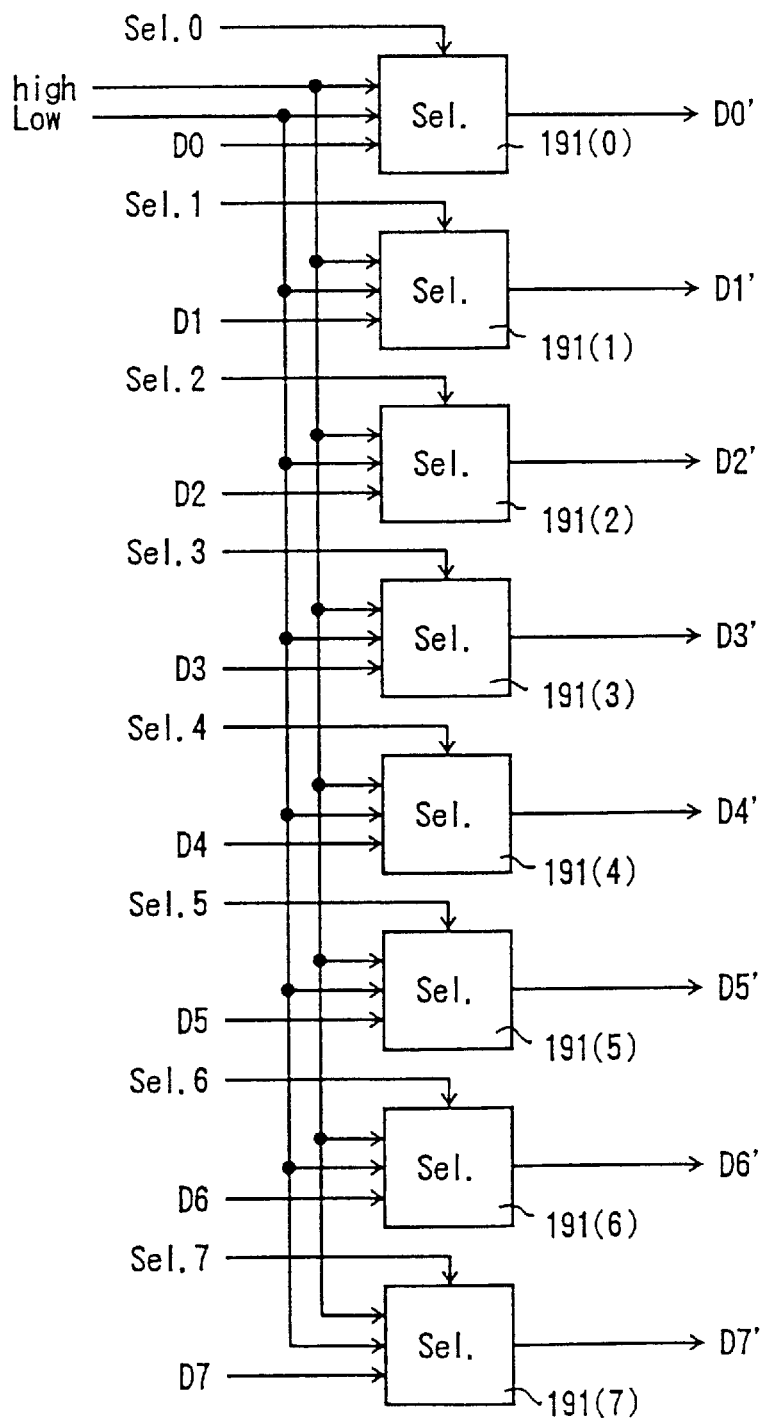
FIG. 20 is a block diagram showing a structure of a D-restriction switching unit used for the Viterbi detector of FIG. 19.

According to FIG. 20, the D-restriction switching unit 19 includes eight selectors 191(0) through 191(7), to which the output values D0 through D7 of the ACS unit 11 are input, respectively. Further, a high-level signal (high) corresponding to bit data "1" and a low-level signal (low) corresponding to bit data "0" are input to each of the selectors 191(i) (i=0 through 7). Selection control signals (SEL.0 through SEL.7) corresponding to the D-restriction of the run length limit for the data recording are supplied to the selectors 191(0) through 191(7), respectively. As each of the bit values D0' through D7' of data to be supplied to the path memory 13, one of each of the corresponding output values D0 through D7 of the ACS unit 11, the fixed value of the high-level signal and the fixed value of the low-level signal is selected based on each of the corresponding selection control signals. This allows Viterbi detection to comply with the D-restriction of the run length limit.

If the nonlinear torsion resulting from the combination of the optical head 20 and the magneto-optical disk 200 is not considered a problem, the nonlinearity extraction unit 17 can be omitted as in the above-described structure. In this case, the selector 145 and the adder 147 both relating to the correction of the expected values based on the nonlinearity can be removed from the expected value setting unit 14 (see FIG. 9).

Figure 21:
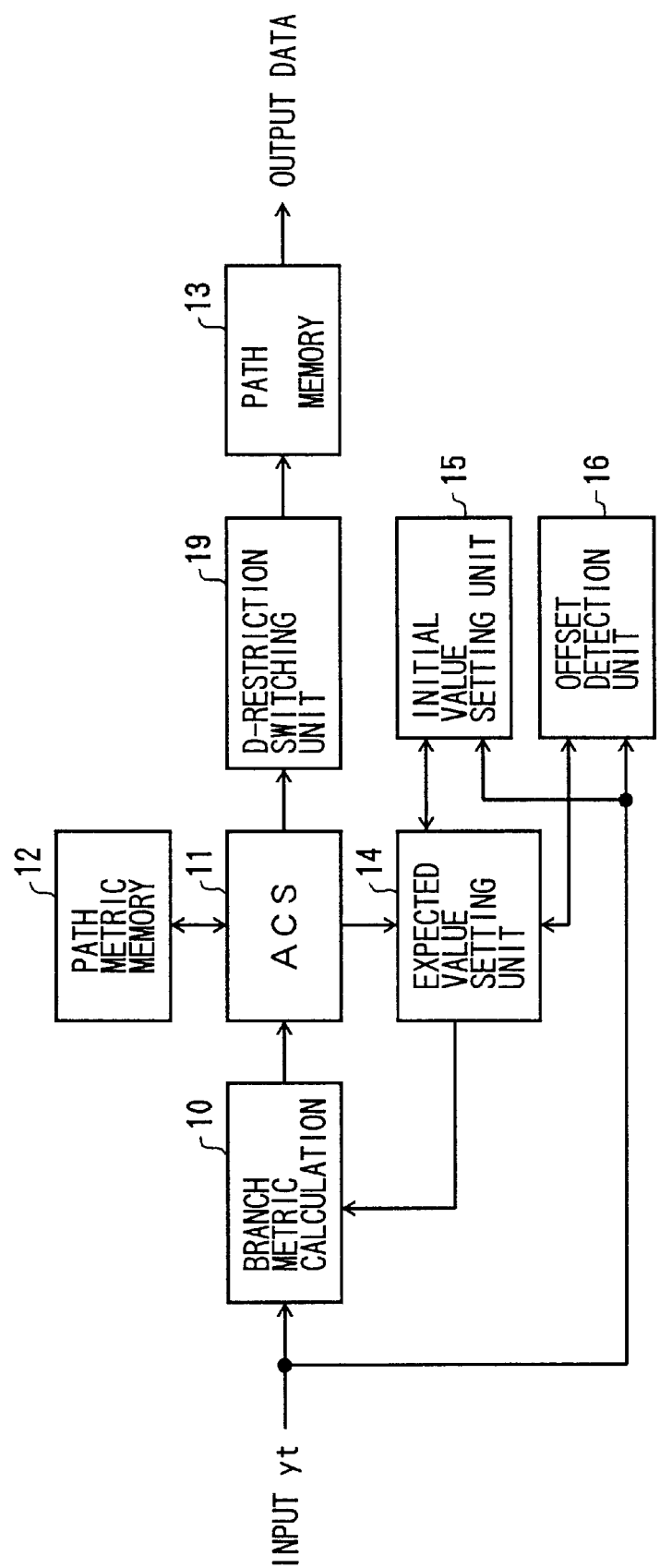
FIG. 21 is a block diagram showing a third structure of the Viterbi detector.

The Viterbi detector 100 can also have a structure as shown in FIG. 21. This structure is formed by removing the phase error detection unit 18 from the structure shown in FIG. 19. The data reproduction system of the Viterbi detector 100 having the structure of FIG. 21 employs, as the synchronizing clock signal, such a clock signal as is obtained from a pulse signal synchronizing with the rotation of the magneto-optical disk or obtained by binarizing the readout signal.

Figure 22:
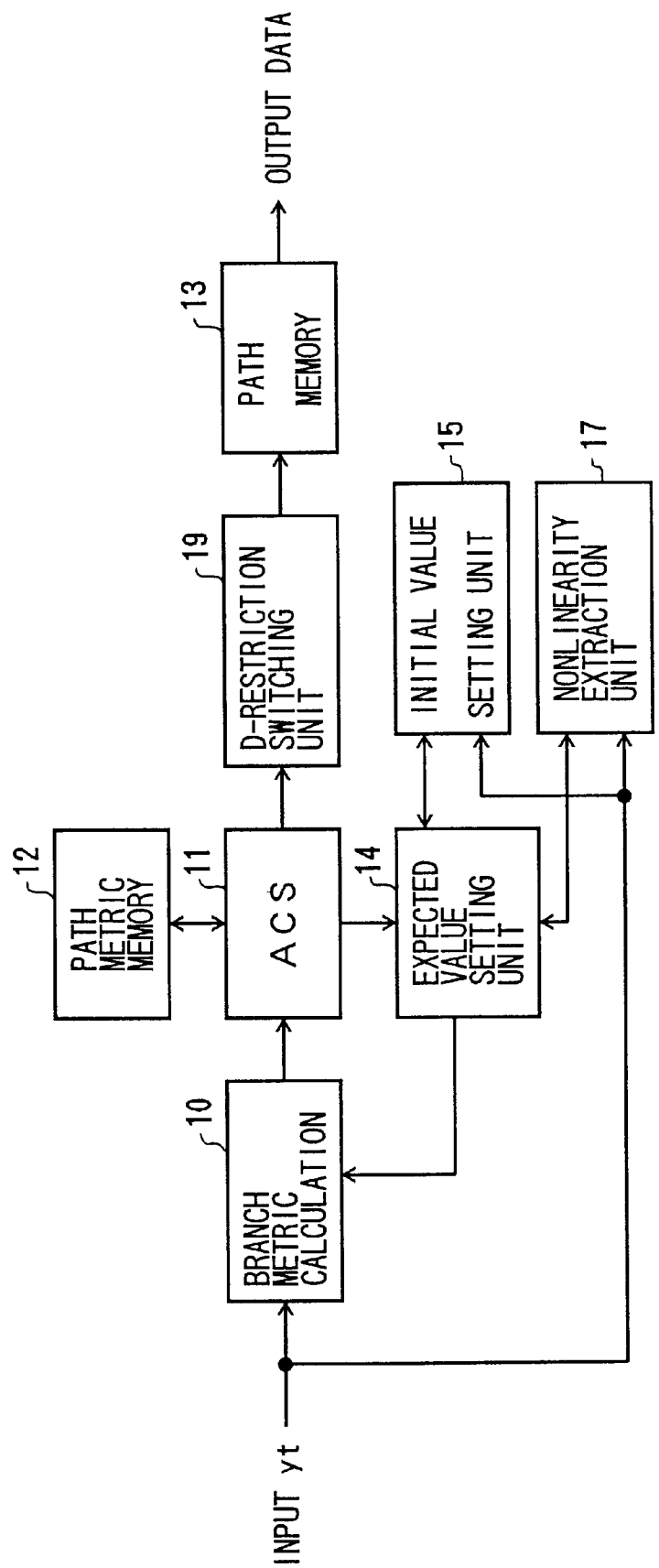
FIG. 22 is a block diagram showing a fourth structure of the Viterbi detector.

The Viterbi detector 100 can further have a structure as shown in FIG. 22. This structure is formed by replacing the offset detection unit 16 of the structure of FIG. 21 with the nonlinearity extraction unit 17. This structure is suitable for a case where the steady offset of the readout signal is negligible. In this case, the selector 143 relating to the correction of the expected values based on the steady offset of the readout signal can be removed from the expected value setting unit 14 (see FIG. 9).

Figure 23:
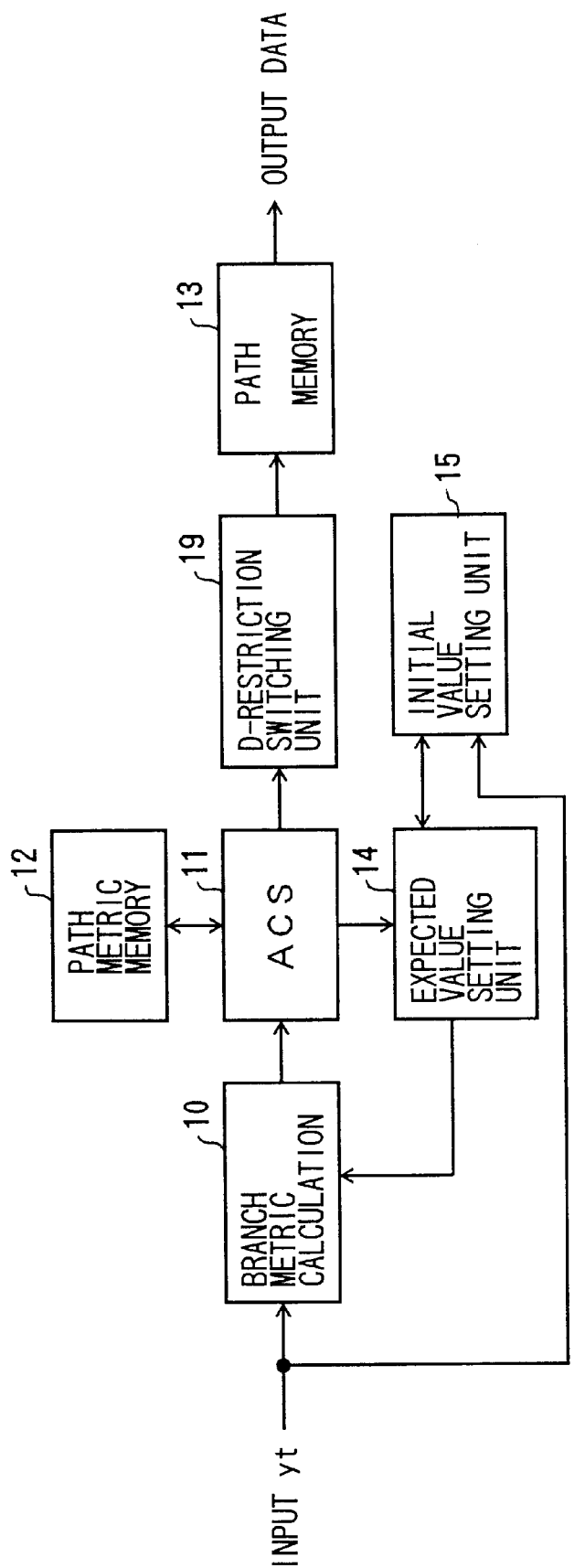
FIG. 23 is a block diagram showing a fifth structure of the Viterbi detector.

Moreover, the Viterbi detector 100 can have a structure as shown in FIG. 23. This structure is formed by removing the nonlinearity extraction unit 17 from the structure of FIG. 22. As a result, the correction of the expected values is made based only on the initial offset Init set in the initial value setting unit 15. This structure is suitable for a case where the steady offset of the readout signal is negligible and double refraction of the optical head 20, or the like, is not considered a problem. In this case, the selectors 143 and 145, and the adder 147, each relating to the correction of the expected values based on the offset and the nonlinearity, can be removed from the expected value setting unit 14 (see FIG. 9).

Figure 24:
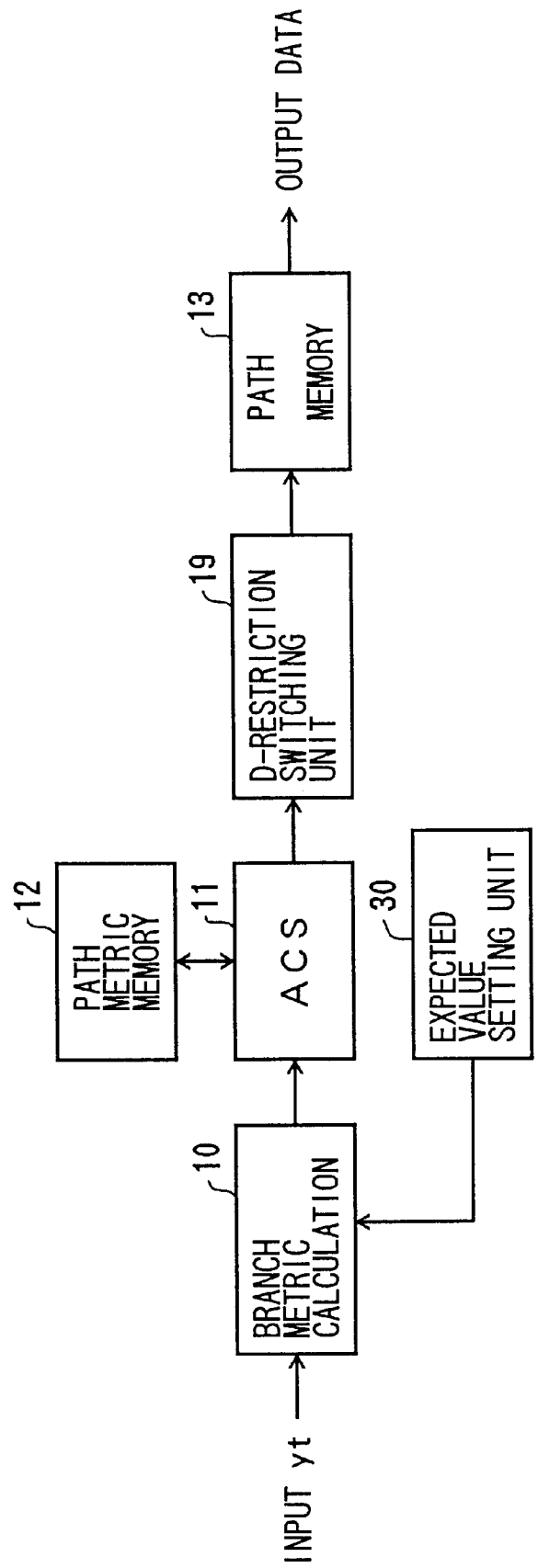
FIG. 24 is a block diagram showing a sixth structure of the Viterbi detector.

The Viterbi detector 100 can furthermore have a structure as shown in FIG. 24. According to this structure, as previously described, an expected value setting unit 30 does not make the correction of the expected values based on the initial offset Init and the nonlinearity. The expected value setting unit, 30 sets the expected values in accordance with, for example, a control signal determined by a control unit (ODC: Optical Disk Controller) (not shown) based on the characteristic of a medium such as a magneto-optical disk, or the characteristic of a reproduction system. The expected value setting unit 30 can also set the expected values based on information input from input keys by a user.

Figure 25:
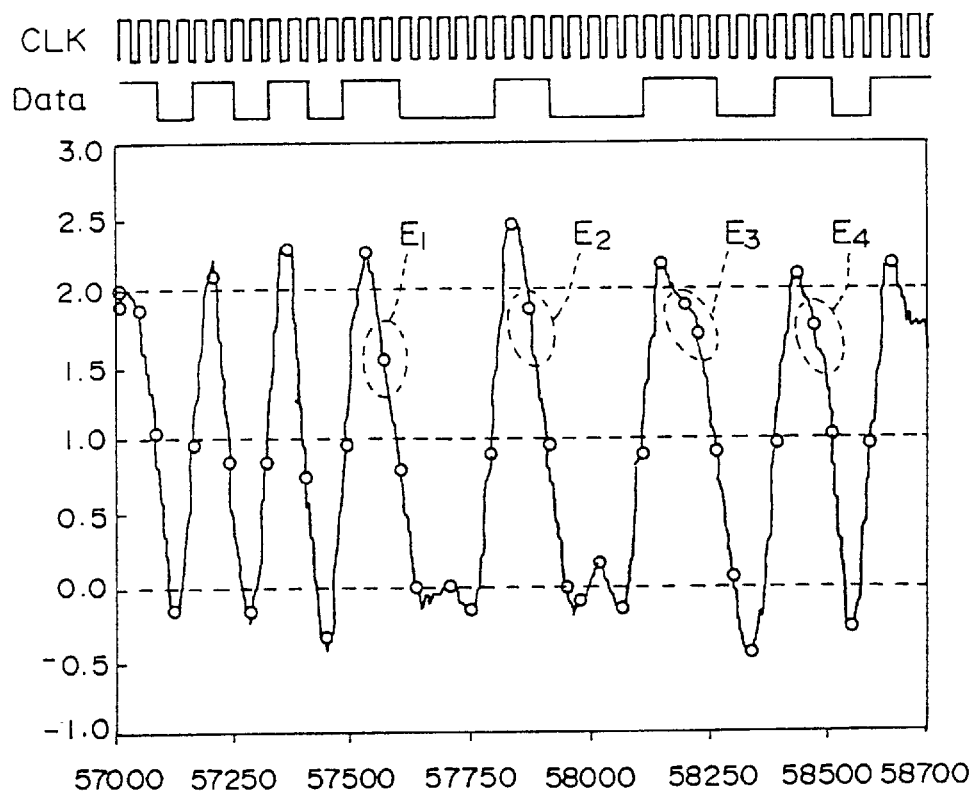
FIG. 25 is a diagram showing nonlinearities appearing in the readout signal.

For example, in the case of employing a RAD (Rear Aperture Detection) medium as a recording medium for an optical disk apparatus, the waveform of a readout signal shows a nonlinearity. This nonlinearity, for example, appears in a falling portion of the readout signal as shown in FIG. 25. FIG. 25 represents a case where a recorded signal of a PR(1, 1) is reproduced. The levels of the sampling points E1 through E4 in the falling portions of the readout signal are affected by the nonlinearity so as to become considerably lower than those of the corresponding expected values.

In a PRML recording/reproducing method using the symmetry of the rising and trailing edges of a recording pit, a margin for a proper data reproduction is reduced for each of the portions of the readout signal corresponding to the trailing edges of the recording pits due to such a nonlinearity of the readout signal.

A description will now be given of a data reproduction system which includes a function to adjust expected values in consideration of such a nonlinearity in a given portion of a readout signal.

Figure 26:
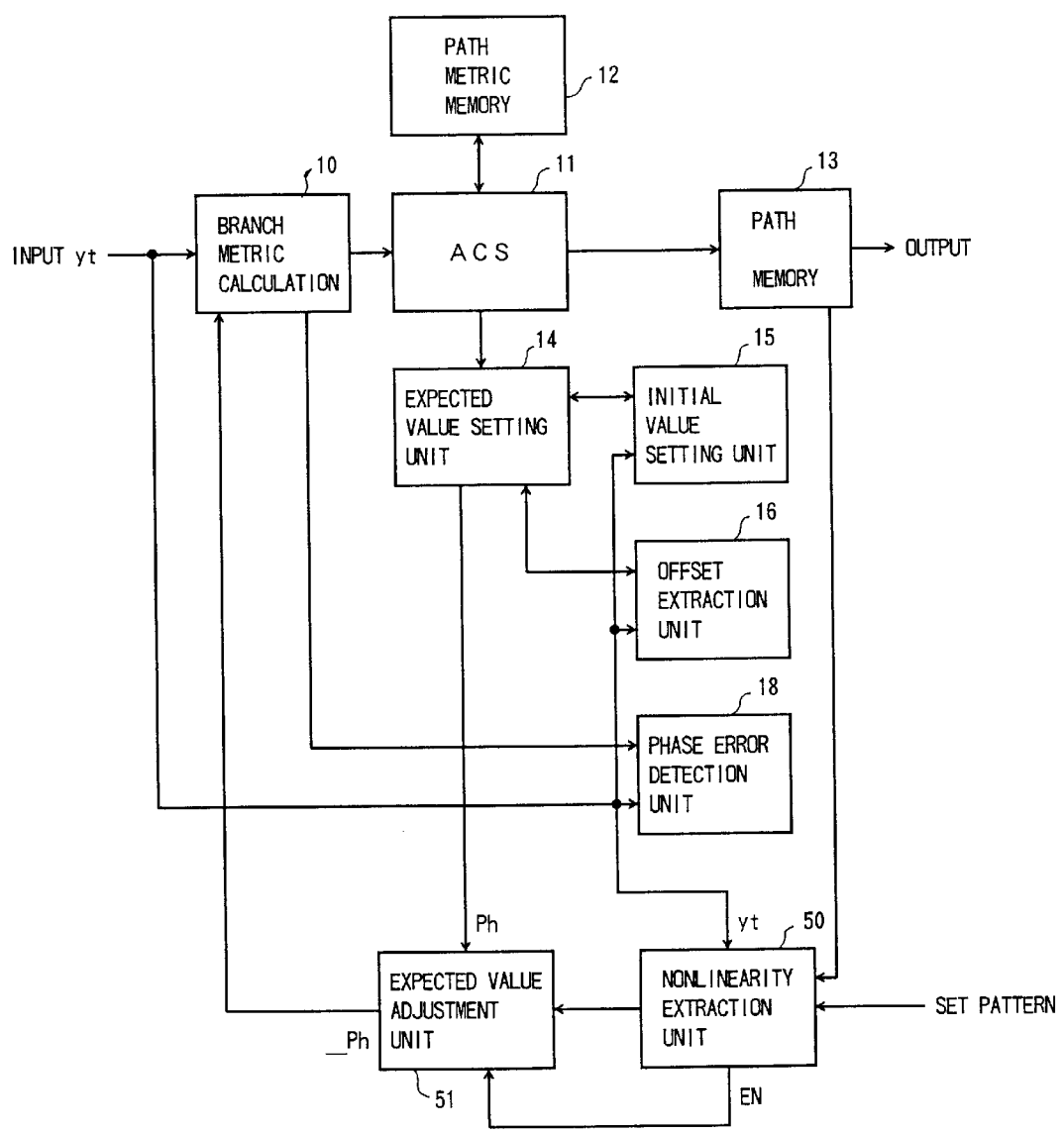
FIG. 26 is a block diagram showing a seventh structure of the Viterbi detector.

The data reproduction system basically has the same structure as shown in FIG. 3. The Viterbi detector 100 of the data reproduction system has a structure as shown in FIG. 26. According to FIG. 26, the Viterbi detector 100, as in the above-described structures, includes the branch metric calculation unit 10, the ACS unit 11, the path metric memory 12, the path memory 13, the expected value setting unit 14, the initial value setting unit 15, the offset detection unit 16 and the phase error detection unit 18. These units have the same functions as described in the above-mentioned structures; that is, the expected value setting unit 14 determines the expected values Ph based on the initial offset supplied from the initial value setting unit 15 and on the offset detected in the offset detection unit 16.

The Viterbi detector 100 of FIG. 26 further includes a nonlinearity extraction unit 50 and an expected value adjustment unit 51. The nonlinearity extraction unit 50 detects falling portions of the readout signal based on the output data of the path memory 13, and calculates the nonlinearities based on a sampled value yt in a detected falling portion. Then, the expected value adjustment unit 51 adjusts the expected values Ph supplied from the expected value setting unit 14 based on the nonlinearities obtained in the nonlinearity extraction unit 50. The adjusted expected values _Ph are supplied from the expected value adjustment unit 51 to the branch metric calculation unit 10.

Figure 27:
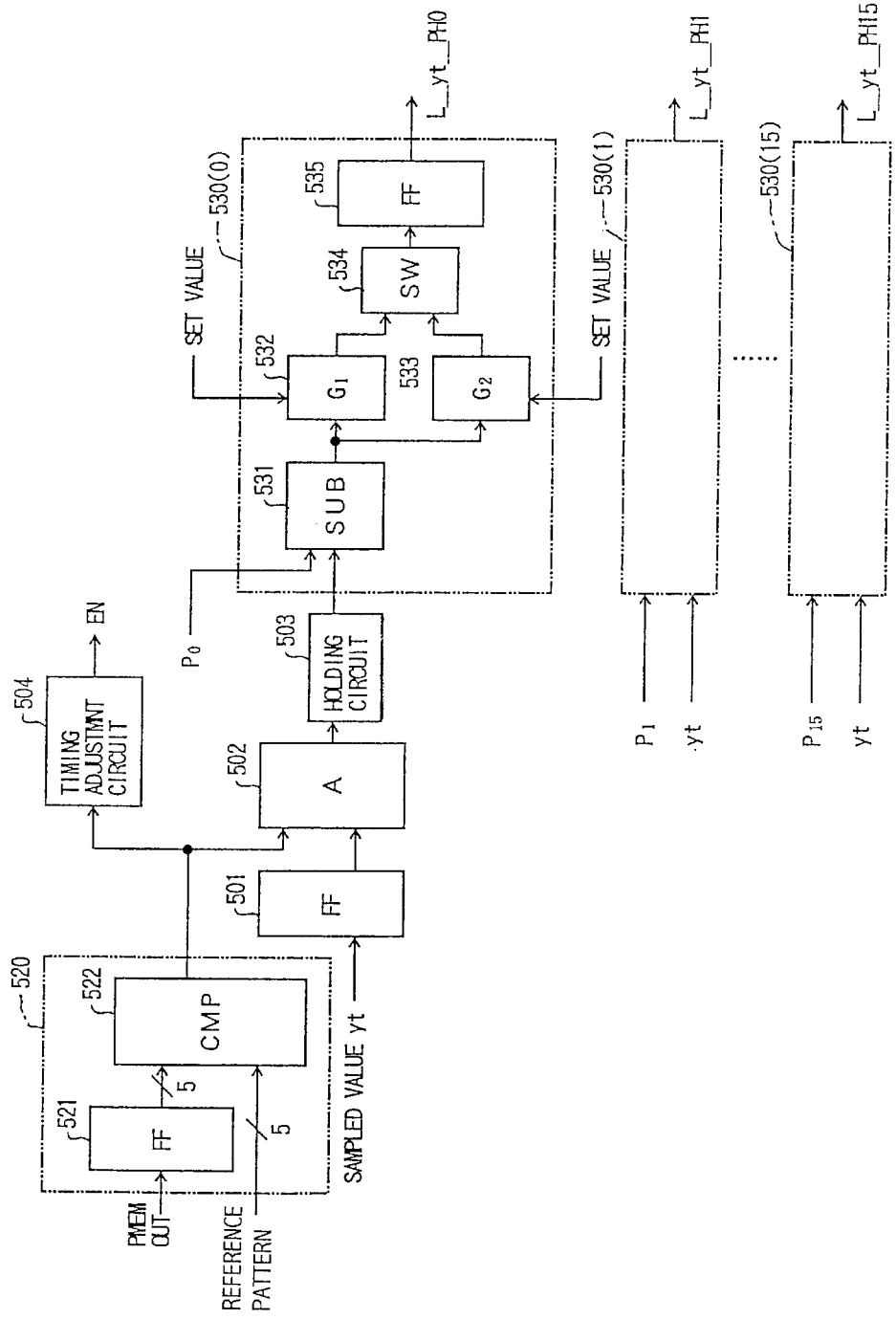
FIG. 27 is a block diagram showing a detailed structure of a nonlinearity extraction unit of the Viterbi detector of FIG. 26.

The above-described nonlinearity extraction unit 50 has a structure as shown in FIG. 27.

In FIG. 27, the nonlinearity extraction unit 50 includes a falling portion detection section 520 for detecting the falling portions of the readout signal, where the nonlinearity appears. The falling portion detection section 520 includes a shift register 521 and a comparator 522. The shift register 521 retains the output data (bit data) supplied from the path memory 13, and outputs, for example, 5-bit data. The comparator 522 compares a reference pattern (for example, "11000") predetermined as a bit pattern corresponding to the falling portions of the readout signal and the pattern of each of the bit data supplied from the above-described shift register 521, and outputs a correspondence signal, which becomes effective when the reference pattern and a pattern of the bit data correspond. The correspondence signal from the comparator 522 becomes a detection signal output from the falling portion detection section 520.

The nonlinearity extraction unit 50 further includes a shift register 501 for holding the sampled value yt, an AND circuit 502 and a holding circuit 503. The AND circuit 502 is controlled by the detection signal supplied from the above-described falling portion detection section 520. When the detection signal is effective (or a falling portion is detected), the sampled value yt set in the shift register 501 is supplied to the holding circuit 503 via the AND circuit 502.

The nonlinearity extraction unit 50 further includes nonlinearity calculation sections 530(0) through 530(15) corresponding to the respective expected values Ph (h=0 through 15). Each of the nonlinearity calculation sections 530(0) through 530(15) includes a subtracter 531, multipliers 532 and 533, a switching circuit 534 and a register 535. The nonlinearity calculation sections 530(0) through 530(15) are supplied with the respective expected values Ph and the sampled value yt held in the holding circuit 503.

Each of the subtracters 531 calculates a difference Ph−yt) between the corresponding one of the expected values Ph and the sampled value yt held in the holding circuit 503. Each of the multipliers 532 multiplies the output value (Ph−yt) of the corresponding one of the subtracters 531 by a predetermined gain G1 (a value smaller than 1) (G1(Ph−yt)). Each of the multipliers 533 multiplies the output value of the corresponding one of the subtracters 531 by a predetermined gain G2 (a value smaller than the G1) (G1(Ph−yt)).

Output values of the respective multipliers 532 are the products of the predetermined magnification G1 and the respective differences between the respective expected values Ph, which are signal levels to be detected, and the sampled value yt sampled in the falling edge portion of the readout signal. Each of the output values of the multipliers 532 becomes the nonlinearity detected in the falling portion. That is, according to this structure, each of the differences between the respective expected values Ph and the sampled value yt is multiplied by the predetermined magnification G1 to become the nonlinearity detected in the falling portion.

Output values of the respective multipliers 533 are the products of the predetermined magnification G2, which is smaller than the G1, and the respective differences between the respective expected values Ph and the sampled value yt. When each of the expected values is adjusted based on the corresponding nonlinearity detected in the falling portion of the readout signal, where the nonlinearity is relatively large, a level margin is reduced for a sampled value yt+1 next to the sampled value yt in the falling portion. Therefore, some percentage (G2/G1) of each of the above-described nonlinearities detected in the falling portion is obtained for a sampling point next to the sampling point in the falling portion. Thus, the predetermined percentage (G2/G1) of each of the nonlinearities detected in the falling portion of the readout signal is employed as a nonlinearity at the sampling point next to the sampling point in the falling portion.

The nonlinearities at the sampling point next to the sampling point in the falling portion may be calculated in accordance with the same algorithm as employed in the case of calculating the nonlinearities at the sampling point in the falling portion, based on the differences between the sampled value yt+1 and the respective expected values Ph.

The nonlinearity may appear in a rising portion depending on the way a magnetic field is applied for reproduction, that is, on the direction of the magnetic field. Therefore, the above-described method can also be applied with respect to the rising portion.

The above-described magnifications Gi and G2 are set with respect to the above-described multipliers 532 and 533 by, for example, an MPU (not shown) controlling the Viterbi detector 100.

The outputs of the respective multipliers 532 and 533 are input to the respective switching circuits 535. The switching circuits 535 switch the outputs thereof to the outputs of the multipliers 532 when the rising portion of the readout signal is detected, and to the outputs of the multipliers 533 at the sampling point next to the rising portion. The outputs of the switching circuits 535 are set in the respective registers 535. The set outputs are output from the respective nonlinearity calculation sections 530(h) as nonlinearities L__yt__PHh.

The above-mentioned detection signal output from the above-described falling portion detection section 520 (the correspondence signal output from the comparator 522) is also input to a timing adjustment circuit 504. The timing adjustment circuit 504 outputs an enabling signal EN which is effective from an input timing of the detection signal supplied from the falling portion detection section 520 to the sampling point next to the falling portion. The enabling signal is supplied to the expected value adjustment unit 51 having a below-described structure.

Figure 28:
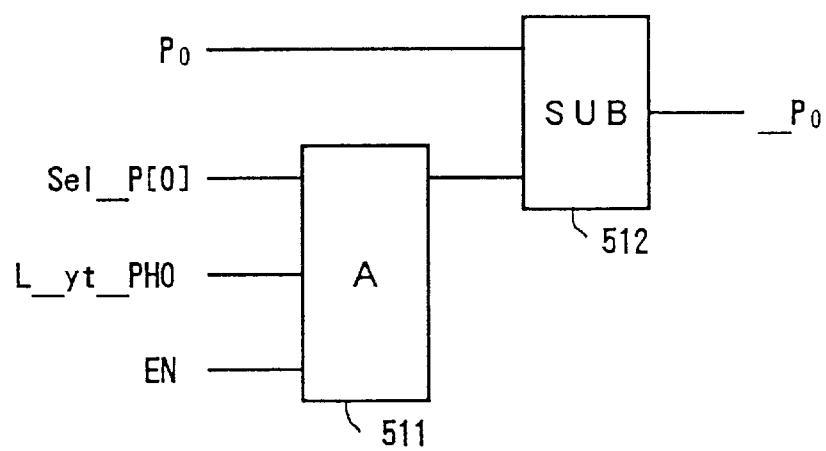
FIG. 28 is a block diagram showing a detailed structure of an expected value adjustment unit of the Viterbi detector of FIG. 26.

The above-mentioned expected value adjustment unit 51 has a structure as shown in FIG. 28. The expected value adjustment unit 51 shown in FIG. 28 is for adjusting the expected value P0 set in the expected value setting unit 14. Expected value adjustment units having the same structure are provided for the other expected values P1 through P15.

According to FIG. 28, the expected value adjustment unit 51 includes an AND circuit 511 and a subtracter 512. The AND circuit 511 is supplied with a selection signal of the expected value P0 Sel__P[0], a nonlinearity L__yt__PH0 output from the nonlinearity calculation section 530(0) corresponding to the expected value P0 in the above-described nonlinearity extraction unit 50 and the enabling signal EN. Therefore, the AND circuit 511 is controlled by the selection signal Sel__P[0] and the enabling signal EN, and the nonlinearity L__yt__PH0 is supplied to the subtracter 512 via the AND circuit 511 when the both of the signals are effective.

The subtracter 512 calculates a difference between the expected value P0 supplied from the expected value setting unit 14 and the nonlinearity L__yt__PH0 supplied via the AND circuit 511 (P0-[L__yt__PH0]). The difference is output from the subtracter 512 as an adjusted expected value __P0. In other words, new adjusted expected values __Ph are obtained by subtracting the corresponding nonlinearities L__yt__PHh calculated in the above-described way from the respective expected values Ph set in the expected value setting unit 14. The adjusted expected values __Ph are supplied to the branch metric calculation unit 10.

According to the above-described structure, when the nonlinearity extraction unit 50 detects the falling portion of the readout signal as a portion showing the nonlinearity of the readout signal, and outputs the nonlinearities L__yt__PHh calculated based on the sampled value yt and the corresponding expected values, the expected value adjustment unit 51 supplies the branch metric calculation unit 10 with the new expected values _Ph obtained by subtracting the nonlinearities L_yt_PHh from the corresponding expected values Ph set in the expected value setting unit 14. On the other hand, when the nonlinearity extraction unit 50 does not detect a falling portion of the readout signal, the expected values Ph set in the expected value setting unit 14 are supplied to the branch metric calculation unit 10 via the expected value adjustment unit 51 as the new expected values _Ph.

When the expected values _Ph are thus supplied to the branch metric calculation unit 10, the Viterbi detection process is performed in the branch metric calculation unit 10, the ACS 11, the path metric memory 12 and the path memory 13.

By the above-described nonlinearity extraction unit 50 and the expected value adjustment unit 51, the expected values corresponding to the sampled value yt in the falling portion of the readout signal showing a nonlinearity are lowered by the respective nonlinearities. Therefore, even though the sampled value yt is considerably lowered due to the nonlinearity of the falling portion, the branch metrics corresponding to the differences between the real sampled value and the respective expected values do not become extremely great in the falling portion because the expected values are also lowered. Thus, the reproduction of data having more likelihood is made possible.

Further, the new expected values are obtained by subtracting the nonlinearities smaller than the nonlinearities of the falling portion from the respective expected values also at the sampling point next to the falling portion. Therefore, it is made possible to avoid the reduction of the level margin for a sampled value obtained at the sampling point next to the falling portion, which reduction results from the subtraction of the nonlinearities from the expected values in the falling portion of the readout signal.

In the above-described structure, the nonlinearities are calculated based on the differences between the sampled value yt and the respective expected values every time a falling portion of the readout signal, which is expected to show a great nonlinearity, is detected. However, if the nonlinearity of each zone of a medium such as a magneto-optical disk is known in advance, it is also possible, every time each zone is detected in a read operation, to adjust the expected values by using the nonlinearity of each detected zone. In this case, by setting a nonlinearity of a sector to be detected before a read gate becomes effective, a previous nonlinearity can be used in successive sectors from its beginning.

The nonlinearity of each zone can be learned. The learned nonlinearities may be stored in nonvolatile memory before the ejection of a recording medium. The stored nonlinearities are used for the reproduction of data from the recording medium.

It is better not to compare rising portions before the above-described learning function becomes effective, that is, during a period immediately after the first read gate becomes effective when the feedback of a phase error is not completed, because the output of a path memory is not accurate. Therefore, it is also possible to prevent the pattern comparison process (the process performed in the falling portion detection section 520) from being performed on falling portions for a predetermined period of time after the read gate becomes effective.

The present invention is not limited to the above-described embodiment of the data reproduction system of the optical disk recording medium (specifically, the magneto-optical disk), and can also be applied to the data reproduction system of such a recording medium as a magnetic disk.

POSSIBILITY OF INDUSTRIAL APPLICATION

According to the data reproduction system of the present invention, as described above, data having more likelihood can be reproduced with higher accuracy because differences between real sampled values and expected values can be reduced by varying the expected values in accordance with the characteristic of a readout signal (an offset, a nonlinearity, etc.) which depends on the characteristics of a recording medium and a reproduction system. As a result, a Viterbi detection process can be performed without being easily affected by the transient response, offset variation, phase error and nonlinear torsion component of the readout signal even though the constraint length of a PR waveform used for the recording of data onto a magneto-optical recording medium is made longer. Further, according to the data reproduction system of the present invention, a phase error is calculated based on the differences between the sampled values and expected values to be sampled of the readout signal, so that a clock signal determining the sampling timings of the readout signal is generated based on the phase error. As a result, data can be reproduced by using a more stable phase error signal for synchronization obtained from the readout signal even though the constraint length of the PR waveform used for the recording of the data onto the magneto-optical recording medium is made longer.

Moreover, when a portion of the readout signal showing a nonlinearity is detected, the expected values are adjusted based on the nonlinearity obtained based on a sampled value, thus increasing a margin for the sampled value for reproducing proper data from the portion of the readout signal showing the nonlinearity.

Therefore, the present invention is suitable for an apparatus for reproducing data from a recording medium with a high recording density such as an optical disk apparatus, a magneto-optical disk apparatus or a magnetic disk apparatus, which is required to reproduce data with more stability.

What is claimed is:

1. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:

an expected value setting unit for variably setting the expected values used for a calculation of the branch metrics based on at least one of an offset and a nonlinearity included in the readout signal.

2. The data reproduction system as claimed in claim 1, wherein said expected value setting unit comprises:

an expected value specification unit which specifies expected values used for obtaining a smallest path metric every time the readout signal is sampled, said expected value setting unit setting the expected values specified in said expected value specification unit.

3. The data reproduction system as claimed in claim 1, wherein said expected value setting unit comprises:
   a default expected value setting unit which sets default values of the expected values,
   said expected value setting unit calculating expected values to be set by correcting the default values of the expected values set in said default expected value setting unit.

4. The data reproduction system as claimed in claim 3, wherein said default expected value setting unit comprises:
   a unit which sets the calculated expected values as default values used for calculating next expected values to be set.

5. The data reproduction system as claimed in claim 1, further comprising:
   a data restriction unit which forcibly restricts, on the basis of a bit arrangement rule during recording of the data, the reproduced data obtained based on the comparison results of the path metrics.

6. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:
   an expected value setting unit for variably setting the expected values used for a calculation of the branch metrics; and
   an offset detection unit which detects an offset included in the readout signal obtained steadily,
   wherein said expected value setting unit includes a second expected value calculation unit which calculates expected values to be set based on the offset detected in said offset detection unit.

7. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:
   an expected value setting unit for variably setting the expected values used for a calculation of the branch metrics; and a nonlinear component extraction unit which extracts a nonlinear torsion component included in the readout signal,
   wherein said expected value setting unit includes a third expected value calculation unit which calculates expected values to be set based on the nonlinear torsion component extracted in said nonlinear component extraction unit.

8. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:
   an expected value setting unit for variably setting the expected values used for a calculation of the branch metrics;
   an initial offset setting unit which sets, as an initial offset, an offset included in the readout signal obtained immediately after a start of a reproduction of the data;
   an offset detection unit which detects an offset included in the readout signal obtained steadily; and
   a nonlinear component extraction unit which extracts a nonlinear torsion component included in the readout signal,
   wherein said expected value setting unit includes:
      a default expected value setting unit which sets default values of the expected values; and
      an expected value correction unit which corrects the default values of the expected values set in said default expected value setting unit, based on at least one of the initial offset set in said initial offset setting unit, the offset detected in offset detection unit, or the nonlinear torsion component extracted in said nonlinear component extraction unit.

9. The data reproduction system as claimed in claim 8, further comprising:
   a unit which sets expected values obtained by a correction in said expected value correction unit as default values to be used in a next correction therein.

10. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:
   an expected value setting unit for variably setting the expected values used for a calculation of the branch metrics; and
   an initial offset setting unit which sets, as an initial offset, an offset included in the readout signal obtained immediately after a start of a reproduction of the data,
   wherein said expected value setting unit includes a first expected value calculation unit which calculates expected values to be set based on the initial offset set in the initial offset setting unit.

11. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:

a phase error calculation unit which calculates a phase error based on differences between the sampled value and expected values used for a calculation of the branch metrics; and a synchronizing clock generation unit which generates a clock signal determining sampling timings of the readout signal based on the phase error obtained in said phase error calculation unit.

12. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:

an expected value setting unit for variably setting the expected values used for a calculation of the branch metrics;

a phase error calculation unit which calculates a phase error based on differences between the sampled value and expected values used for a calculation of the branch metrics; and a synchronizing clock generation unit which generates a clock signal determining sampling timings of the readout signal based on the phase error obtained in said phase error calculation unit.

13. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:

an expected value setting unit which sets the expected values used for a calculation of the branch metrics;

a nonlinear portion detection unit which detects a nonlinear portion of the readout signal;

a nonlinearity obtaining unit which obtains nonlinearities included in the readout signal when said nonlinear portion detection unit detects a given nonlinear portion of the readout signal; and an expected value adjustment unit which adjusts the expected values set in said expected value setting unit based on the nonlinearities calculated in said nonlinearity calculation unit.

14. The data reproduction system as claimed in claim 13, wherein said nonlinearity obtaining unit comprises:

a nonlinearity calculation unit which calculates the nonlinearities based on the sampled value of the readout signal.

15. The data reproduction system as claimed in claim 13, wherein said nonlinear portion detection unit detects a falling portion or a rising portion of the readout signal.

16. The data reproduction system as claimed in claim 13, wherein said nonlinear portion detection unit comprises:

a bit string extraction unit which extracts a bit string formed of a given number of bits from the reproduced data; and a pattern determination unit which determines whether a pattern of the bit string extracted in said bit string extraction unit corresponds to a reference pattern predetermined as a bit pattern corresponding to a nonlinear portion.

17. The data reproduction system as claimed in claim 14, wherein said nonlinearity calculation unit comprises:

a subtraction unit which calculates differences between the expected values set in the expected value setting unit and the sampled value; and a unit which calculates the nonlinearities based on the differences calculated in said subtraction unit.

18. The data reproduction system as claimed in claim 17, wherein said unit which calculates the nonlinearities comprises:

a multiplier which multiplies the differences calculated in said subtraction unit by a predetermined magnification, said unit which calculates the nonlinearities supplying outputs of said multiplier as the nonlinearities.

19. The data reproduction system as claimed in claim 13, wherein said expected value adjustment unit comprises:

a subtraction unit which subtracts the nonlinearities obtained in said nonlinearity obtaining unit from the corresponding expected values set in the expected value setting unit, said expected value adjustment unit supplying outputs from said subtraction unit as adjusted expected values for the calculation of the branch metrics.

20. A data reproduction system which determines reproduced data based on comparison results of path metrics calculated in accordance with a Viterbi algorithm based on branch metrics calculated from expected values and a sampled value of a readout signal, the readout signal being obtained from a recording medium on which data is recorded in accordance with a recording signal of a partial response waveform, the expected values being determined by the partial response waveform, and the sampled value being obtained by sampling the readout signal at a predetermined frequency, said data reproduction system comprising:

an expected value setting unit which sets the expected values used for a calculation of the branch metrics;

a nonlinear portion detection unit which detects a nonlinear portion of the readout signal;

a first nonlinearity calculation unit which calculates, based on the sampled value of the readout signal, first nonlinearities of a given nonlinear portion of the readout signal when said nonlinear portion detection unit detects the given nonlinear portion;

a second nonlinearity calculation unit which calculates, based on the sampled value of the readout signal, second nonlinearities at a sampling point next to the detected portion of the readout signal, the second nonlinearities being smaller than the first nonlinearities; and an expected value adjustment unit which adjusts, based on the first nonlinearities calculated in said first nonlinearity calculation unit, the expected values set in said expected value setting unit with respect to the sampled value sampled at the detected portion, and adjusts, based on the second nonlinearities calculated in said second nonlinearity calculation unit, the expected values set in said expected value setting unit with respect to a sampled value at the sampling point next to the detected portion of the readout signal.

21. The data reproduction system as claimed in claim 20, wherein said nonlinear portion detection unit detects a falling portion or a rising portion of the readout signal.

22. The data reproduction system as claimed in claim 20, wherein:

said first nonlinearity calculation unit calculates the first nonlinearities based on the sampled value sampled at the detected portion of the readout signal; and said second nonlinearity calculation unit calculates the second nonlinearities, which are smaller than the first nonlinearities, based on the sampled value sampled at the detected portion of the readout signal.

* * * * *